US012390819B2

(12) United States Patent
Matlack

(10) Patent No.: US 12,390,819 B2
(45) Date of Patent: *Aug. 19, 2025

(54) SYSTEMS AND METHODS FOR PROVIDING COATING OPERATIONS

(71) Applicant: Michael Matlack, Winter Park, FL (US)

(72) Inventor: Michael Matlack, Winter Park, FL (US)

(73) Assignee: Michael Matlack, Winter Park, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/359,599

(22) Filed: Jun. 27, 2021

(65) Prior Publication Data

US 2021/0323007 A1 Oct. 21, 2021

Related U.S. Application Data

(63) Continuation of application No. 16/224,743, filed on Dec. 18, 2018, now Pat. No. 11,045,826, which is a continuation-in-part of application No. 15/134,874, filed on Apr. 21, 2016, now Pat. No. 10,155,235.

(60) Provisional application No. 62/150,359, filed on Apr. 21, 2015.

(51) Int. Cl.

| | |
|---|---|
| ***B05B 5/08*** | (2006.01) |
| ***B05B 9/00*** | (2006.01) |
| ***B05B 9/04*** | (2006.01) |
| ***B05B 12/14*** | (2006.01) |
| ***B05B 14/30*** | (2018.01) |
| ***B05B 15/555*** | (2018.01) |
| ***B67D 7/00*** | (2010.01) |
| *B05B 15/40* | (2018.01) |

(52) U.S. Cl.
CPC .............. *B05B 5/085* (2013.01); *B05B 9/007* (2013.01); *B05B 9/0406* (2013.01); *B05B 12/1463* (2013.01); *B05B 12/1472* (2013.01); *B05B 14/30* (2018.02); *B05B 15/555* (2018.02); *B67D 7/00* (2013.01); *B05B 15/40* (2018.02)

(58) Field of Classification Search
None
See application file for complete search history.

(56) References Cited

U.S. PATENT DOCUMENTS

| | | | | |
|---|---|---|---|---|
| 3,904,117 A * | 9/1975 | Adams, Jr. | A62C 27/00 | 239/146 |
| 3,976,087 A * | 8/1976 | Bolton | A01M 7/0092 | 137/15.01 |
| 6,439,473 B1 * | 8/2002 | Meyer | G01G 19/38 | 239/69 |
| 10,155,235 B2 * | 12/2018 | Matlack | B05B 5/085 | |

* cited by examiner

*Primary Examiner* — Michael P. Rodriguez
(74) *Attorney, Agent, or Firm* — Accel IP Law, PLLC; Ferdinand M. Romano

(57) ABSTRACT

A coating system operations vehicle. Related methods are provided for filling a tank and operating coating equipment on a vehicle. The methods include pumping coating from containers into a tank on the vehicle and dispensing the coating for application on a surface. A method also includes removing residual coating from the containers after pumping out coating and adding the residual coating material to the tank. If the level of coating is at the desired level in the tank, a layer of water may be formed over the coating in the tank.

4 Claims, 21 Drawing Sheets

SYSTEMS AND METHODS FOR PROVIDING COATING OPERATIONS

CROSS REFERENCE TO RELATED APPLICATIONS

This application is a Continuation in Part of U.S. patent application Ser. No. 15/134,874 filed 21 Apr., 2016, incorporated herein by reference and which claims priority to U.S. Provisional Patent Application Ser. No. 62/150,359 filed Apr. 21, 2015.

FIELD OF THE INVENTION

The invention relates to industrial systems and methods for applying coating materials and, more particularly, to mobile systems and methods for providing and dispensing liquid coating materials for application to surfaces.

BACKGROUND

Conventionally, transport vehicles carry paint to job sites for dispensing from individual shipping containers to perform commercial projects. Containers of paint, typically referred to as buckets, are manually carried from the vehicle to locations around the job sites. The paint is then applied with a sprayer directly from the buckets to surfaces at locations around the job sites.

SUMMARY OF THE INVENTION

According to an embodiment of the invention, a method for providing a liquid coating, such as paint, for application to surfaces, includes providing a mobile coating operations vehicle having a plurality of tanks (e.g., six tanks) mounted for dispensing the coating directly from the coating operations vehicle. The combined holding capacity of the tanks may be on the order of at least 300 gallons (~1,136 liters), with individual tanks having capacities ranging in size, e.g., from 50 to 80 gallons (~190 to 303 liters) but a larger number of relatively small capacity tanks is contemplated to provision the coating operation vehicle with more coating colors or types. The coating operations vehicle further includes a plurality of hydraulic spray units mounted for powered operation on the vehicle with feed lines connected to extend from the mounted spray units to dispense the coating a substantial distance, e.g., 180 feet (60 meters) or more away from the coating operations vehicle. By way of example, prior to dispensing the coating, the coating operations vehicle is brought to a location at which a source of supply for the coating is present for transfer into the tanks. This location may be at a facility which distributes buckets of coating for contractor pick-up or at a central location at a job site. However, a distribution facility may receive the coating from manufacturers in large containers such as tank cars or 55 gallon (~208 liter) size barrel drums A pumping system on the coating operations vehicle transfers the coating from the source of supply to the tanks. When the coating is simultaneously transferred from multiple buckets or barrel drums, the pumping system may include multiple draw tubes to transfer the coating into tanks on the coating operations vehicle.

A manifold, connected between the pumping system and the tanks, includes multiple fill lines, with at least one fill line extending to one of the tanks. A manually adjustable fill valve is positioned in each fill line (i) for controlled flow of the coating into each of the tanks and (ii) for selection of tanks for receipt of the coating through one or multiple draw tubes into one or more tanks. The controllable valves facilitate selection of the coating from among varies types and may enable simultaneous transfer of different coating materials into different tanks via the one or more draw tubes. The coating material may be pumped from the source of supply and through each draw tube at, for example, a minimum rate of two gallons per minute via the manifold into the one or more tanks.

When the source of supply of the coating is in the form of multiple buckets, each bucket may have as nominal holding capacity at least five gallons (~19 liters), with the totality of containers providing enough coating to fill at least one tank. The step of pumping the coating may include using the pumping system to transfer the coating from the totality of containers, e.g., buckets, through the one or more draw tubes and into one or more tanks on the vehicle.

There is disclosed a coating delivery system for providing a liquid coating, such as paint, for application to surfaces. In one embodiment, the coating delivery system includes a coating operations vehicle having a plurality of tanks mounted thereon for use in the vehicle, where the combined holding capacity of the tanks may be on the order of 300 gallons. The system also includes a plurality of hydraulic coating spray units mounted for powered operation on the vehicle. A plurality of feed lines are connected to extend from the mounted spray units which are, in one embodiment, capable of dispensing the coating 180 feet (60 meters) or more away from the coating operations vehicle. The exemplary coating delivery system includes a pumping system to transfer coating from a source of coating supply to one or more tanks, where the pumping system includes one or more draw tubes. The system also includes a manifold connected between the pumping system and the tanks, the manifold including multiple fill lines, each extending to one of the tanks. A sensor unit, which measures the level of coating within each tank, is configured to transmit a signal to the pumping system when the level of coating material in the one or more tanks is at a desired level in order to deactivate the pumping system.

One embodiment of a method for dispensing liquid coating for application to surfaces includes providing a coating operations vehicle on which a plurality of tanks are mounted for use on the vehicle. The combined holding capacity of the tanks may be on the order of 300 gallons. The tanks are filled with the coating to a desired or predetermined level. The coating operations vehicle further includes a plurality of hydraulic spray units mounted for powered operation on the vehicle and a plurality of hose lines connected to extend from the mounted spray units which are capable of dispensing the coating 180 feet (60 meters) or more away from the coating operations vehicle. A first input manifold is connected between multiple ones of the tanks and at least a first of the hydraulic spray units, with the first input manifold including a plurality of manifold input lines, each connected to receive flow of coating material from one of the tanks.

The first input manifold also includes at least one output line connected between the manifold input lines and at least one of the hydraulic spray units to carry flow of coating material from the manifold input lines to at least one of the hydraulic spray units. The method may include providing one or more additional input manifolds, with each input manifold including a plurality of additional manifold input lines and at least one output line. Each additional input manifold is also connected to receive flow of coating material from one of the tanks, and the at least one output line is connected between the manifold input lines and at least one of the hydraulic spray units to carry flow of coating material from the manifold input lines to at least one of the hydraulic spray units. The method may also include providing one or more valves to control flow from one or more input lines in the first input manifold to enable selection of flow of coating material into the at least one of the hydraulic spray units. Valves may selectively deliver the coating material between different hose lines.

There is disclosed an embodiment of a dispensing system for dispensing liquid coating, such as paint, to surfaces. The dispensing system includes a coating operations vehicle and a plurality of tanks mounted for use on the coating operations vehicle. The combined holding capacity of the tanks may be on the order of 300 gallons. Each tank includes an output valve. The system further includes a plurality of hoses on reels mounted on the vehicle, flow through the hoses controlled with an input valve. The system further includes hydraulic spray units mounted for powered operation on the vehicle with an input manifold having input ports connected to the plurality of tanks and an output port connected to the plurality of hoses. The hydraulic spray units are configured to draw coating through the intake manifold from at least one in the plurality of tanks when the output valve of the at least one tank is in an open position. The coating spray units are configured to deliver coating material from the output port to at least one of the plurality of hoses when the input valve of the at least one hose is in an open position.

A method for cleaning a liquid coating from one or more tanks on a vehicle includes opening an output valve of the one or more tanks on the vehicle and draining coating of a first type through the output valve of the one or more tanks. Pressurized water is applied along an inside surface of the one or more tanks to remove residual coating of the first type from the inside surface of the one or more tanks. The method also includes draining the water through the output valve of the one or more tanks and repeating the applying and draining steps if the drained water includes the residual coating material of the first type.

A method for cleaning liquid coating material from one or more tanks on a vehicle includes opening a first output valve of one or more tanks on a vehicle and draining coating material of a first type through the first output valve of the one or more tanks and drawing pressurized water from a pump on the vehicle through a water intake valve of the one or more tanks. The pressurized water is applied along an inside surface of the one or more tanks to remove residual coating material of the first type from the inside surface of the at least one tank. The water is drained through a second output valve of the one or more tanks. The method further includes spraying the water through one or more hoses connected to the second output valve and repeating the drawing, applying, draining and spraying steps when the water sprayed through the one or more hoses includes residual coating of the first type. The method also includes pumping a coating of a second type through a fill valve of the one or more tanks using a draw pump if the sprayed water through when the one or more hoses no longer include residual coating material of the first type.

An embodiment of system for cleaning a liquid coating from one or more tanks on a vehicle includes a vehicle and a plurality of tanks mounted for use on the vehicle, and a container to drain coating material of a first type from one or more tanks. The system also includes a water delivery device within each tank and a pump on the vehicle configured to provide pressurized water to the water delivery device within the one or more tanks and apply the pressurized water along an inside surface of the one or more tanks to remove residual coating material of the first type from the inside surface. The system also includes one or more hoses configured to spray the water from the one or more tanks.

An embodiment of a method for cleaning a nozzle of a spray gun includes drawing pressurized water from a pressure washer and injecting the pressurized water from the pressure washer to an interior region of the open container. The spray gun nozzle is inserted into the interior of the open container to impact the spray gun nozzle with the injected pressurized water for a minimum time period.

Another embodiment of a method for cleaning a nozzle of a spray gun includes, after spraying a coating on a surface from a spray gun nozzle on an end of a hose, injecting pressurized water drawn from a pressure washer from orifices to within an interior of an open canister for a minimum time period. The spray gun nozzle is rotated about a position within the interior of the open canister to direct the pressurized water on the spray gun nozzle from multiple angles with respect to the nozzle position to dislodge residual coating accumulated on the spray gun nozzle during the spraying step. An embodiment of a system for cleaning a nozzle of a spray gun includes a coating operations vehicle which comprises hydraulic spray equipment operable to simultaneously apply coatings with multiple spray guns to perform a project at a job site. In one embodiment the system includes a canister, a pressure washer configured on the vehicle to draw a liquid from a first holding tank on the vehicle. The system further includes a pressure washer valve between the pressure washer and the canister to configure the pressure washer to deliver multiple sprays of pressurized liquid, e.g., water, through orifices into the canister to clean the spray gun nozzle when the pressure washer valve is in an open position. The system further includes a second holding tank on the vehicle configured to receive the pressurized liquid used to clean the component.

BRIEF DESCRIPTION OF THE DRAWINGS

Features, aspects and advantages of the present invention will be better understood when the following detailed description of embodiments of the invention is read with reference to the accompanying drawings in which like reference numerals refer to similar elements and wherein.

DETAILED DESCRIPTION

Figure 1:
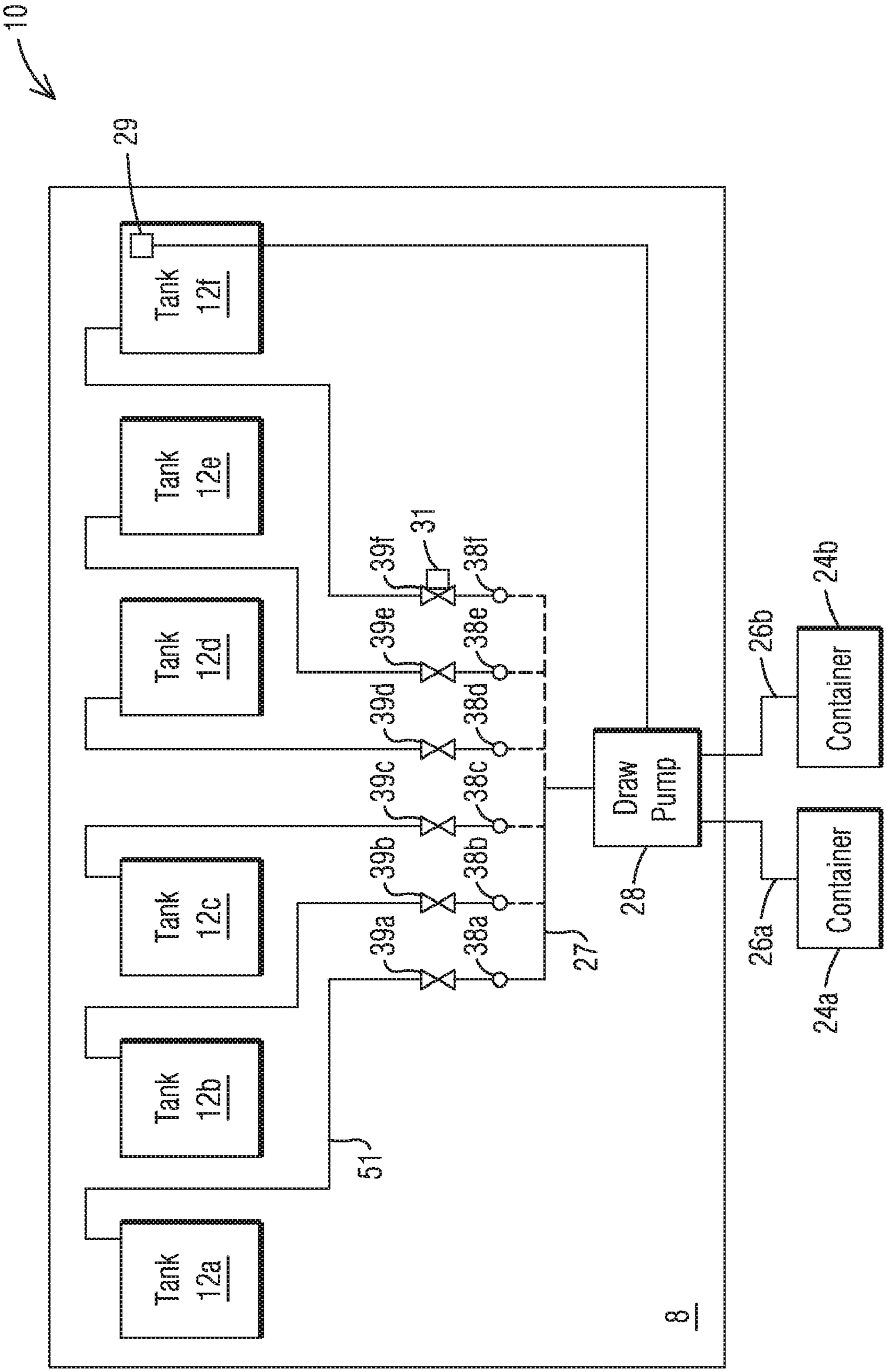
FIG. 1 schematically illustrates a system for filling tanks on a coating operations vehicle with liquid coating material, according to an embodiment.

Before describing in detail particular embodiments of systems and methods according to the invention, it is noted that the present invention resides primarily in a novel and non-obvious combination of components and process steps. So as not to obscure the disclosure with details that will be readily apparent to those skilled in the art, certain conventional components and steps have been omitted or presented with lesser detail, while the drawings and the specification describe in greater detail other elements and steps pertinent to understanding the invention. Further, the illustration of an embodiment does not define limits as to the definition of any system or method according to the invention, but only provide examples which include features that are permissive rather than mandatory and illustrative rather than exhaustive.

Novel subsystems are now described for a mobile industrial coating system 4. In the illustrated embodiments the subsystems are integrated into a truck. Exemplary methods of operating the associated subsystems are also illustrated. The meaning of the term coating spans a wide variety of spray-on coatings, including paints, primers, sealants and a variety of finish coatings typically applied to surfaces. When the description refers to paint it is to be understood that, unless otherwise stated, the description is not limited to embodiments which apply paint and can apply to coatings generally. Also, the terms coating and coating material are used interchangeably to describe a coating. Generally, many embodiments and examples of the invention are described with reference to equipment which pumps liquid, including generating high pressure sprays. Use of terms such as paint sprayer, hydraulic sprayer, draw pump and paint sprayer pump are to be understood as equipment which includes a pump suitable for the described purpose with understanding that, in principal other types of pumps may perform the described function.

The example system 4 comprises a series of subsystems assembled primarily on the bed of the truck to provide the illustrated coating operations vehicle 8. It is to be understood that the configuration of the coating operations vehicle and the sizes of components thereon may be varied as may be most suitable to optimally perform daily activities for any in the variety of large scale industrial activities, including interior and exterior painting of buildings and other structures. Although the following description of the vehicle 8 and associated subsystems refers to paint as the coating, it is to be understood that any liquid coating may be handled by the vehicle 8 and its subsystems. The subsystems include: (i) a paint filling system 10 which transfers large quantities of paint to the vehicle for high volume dispensing; (ii) a multi-user paint dispensing system 200 which pumps the paint from large reservoir tanks through multiple hose lines that enable simultaneous spraying of different coatings (e.g., multiple coating types or multiple coating colors), by operators at large distances from the vehicle (e.g., for interior and exterior work in different buildings or in different rooms of the same building); and a series of cleaning and maintenance systems which reduce cleaning time and extend equipment life, including; (iii) a nozzle spray cleaning system 600; (iv) a tank cleaning system 400 which facilitates changing of coating types and colors in the reservoir tanks; (v) a pump lubrication system 1000; and (vi) a multi-pump oil changing system 800 for motorized equipment installed on the vehicle 8. Generally, the mobile industrial painting system 4 provides a series of features which reduce equipment operating costs and reduce the time and costs for preparing and performing painting services. The unique combination of subsystems provides overall reductions in the labor required for performing daily activities (e.g., set-up, actual painting, cleaning and associated maintenance), permitting division of labor, a higher level of productivity and lower overall cost of providing services.

Before describing the subsystems in detail, exemplary features of a few of the subsystems are summarized. The tank filling system 10 provides high volume delivery of paint into a series of tanks during a large volume dedicated fill operation that can transfer the liquid from over a hundred smaller (e.g., five gallon capacity) containers. See the example embodiment of FIG. 1. The filling process avoids waste due to non-transfer of residual paint otherwise left in the containers. The process prevents loss of liquid which normally remains in a container with a conventional paint pumping system that draws paint directly from the smaller container. Conventional systems do not draw all of the paint from the smaller containers. However, during a transfer operation (e.g., from multiple five gallon buckets into a tank) with the filling system 10, the system can minimize the amount of residual paint in the container. The transfer operation performed with the tank filling system enables the operator to manually facilitate transfer of any paint remaining in the container after a pumping system initially transfers most of the contents. Thus, for the first time, systems are provided which enable a practical method, which is both time efficient and convenient, for preventing loss of relatively small amounts of paint, e.g., between two and eight ounces, which would otherwise be cumulatively lost in the process of serially drawing paint from multiple small containers. With conventional dispensing systems and methods, efforts to avoid loss of such residual amounts of coating present in buckets have not been regarded worthwhile in the overall cost structure for performing coating operations.

Figure 2:
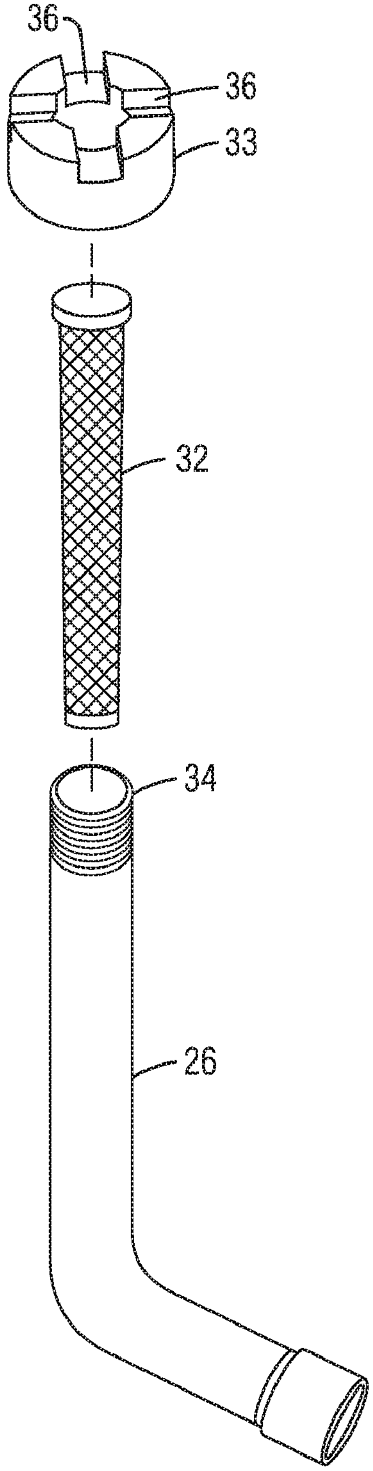
FIG. 2 is an exploded view of an exemplary assembly comprising a cap which secures a filter within a draw tube of the system shown in FIG. 1.

The tank dispensing system 200 provides a level of flexibility heretofore not available to customize operations for the needs of a particular activity. See the example embodiment of FIG. 2. With multiple tanks, each connected to operate through a dedicated pump system, also mounted on the coating operations vehicle 8, the mobile system can carry a different coating material (e.g., interior or exterior paint or primer) in each tank; and the associated pump system can feed multiple spray lines so that multiple painters can each quickly change the coating being dispensed without having, for example, to clear the pumps, intake lines, hoses and spray equipment when changing the coating. This avoids waste and eliminates a series of steps normally taken by a painter in order to transition between different types of coating applications on the same surface or to move between rooms in a building that have different coating requirements. Advantageously, multiple long spray hoses (e.g., greater than two hundred feet in length, and ranging up to 400 feet (~122 meters) or more), may be connected to each of the tanks and extended from the vehicle 8 to easily deliver paint to various locations around a job site. This relieves workers from having to bring heavy, cumbersome buckets of paint into, or within a few feet of, a room being painted. The workers can apply paint using With spray guns attached on the ends of hoses of extended lengths, workers can apply the paint without having the time consuming burden of carrying volumes of the paint within 50 feet (~15 meters) from the point of application, unsealing a full bucket of paint and transferring the intake end of a hose from an empty bucket to a full bucket in order to draw more paint into the spray gun. Rather, the tank dispensing system 200 allows the operator to continue applying the coating without frequent disruptions to interchange containers.

Another advantage of the tank dispensing system 200 is that advantageously, the tanks 12 on the coating operations vehicle 8 are sufficiently large that multiple workers can continuously draw paint from each tank to apply the same coating on multiple large surface areas that are at different locations on the same job site—without incurring down-time to refill paint containers. Generally, with the system 200, operators are able to spend a higher percentage of time applying coatings instead of changing between different types of coating containers and cleaning work areas after changing of containers. Further, when changing the type of coating to be applied (e.g. when going from a primer to a paint, it is no longer necessary to clear the lines feeding the sprayer since lines for each coating type or color can be dedicated to that coating type or color. The painter can simply disconnect the sprayer, clean the sprayer with the system 600 and attach the sprayer to a different feed line to provide the next coating. See FIGS. 18 and 21.

With the tank dispensing system 200 providing an ability to rapidly change the coating being sprayed, it becomes advantageous to move the sprayers among feed lines containing different coatings. The nozzle cleaning system 600 is readily and conveniently available [in a work station format] for rapid light cleaning when changing the coating and for deep cleaning, such as required after extended use or drying of coating material, to remove residual paint which typically builds up inside a nozzle or a safety housing or along the tip of the spray gun. Advantageously, the system allows a person to clean the spray gun nozzles by selectively applying high pressure water to impinge on surfaces of the nozzles and dislodge residual paint, e.g., on the interior surfaces In the past it was not practical to use large tanks, e.g., having capacity in the range of 50 to 100 gallons (~189 to 379 liters), to dispense paint. In part this was because storage of paint for long periods of time in vessels exposed to air causes drying and collection of residues which would have to be completely removed from the vessel interior before introducing a different type or a different color of coating material. The tank cleaning system 400 is provided on the vehicle 8 for in situ cleaning, whenever it becomes necessary, to replace a first type of coating used in one of the tanks with a second type of coating. The system 400 quickly cleans interior surfaces of the tank to ensure that the first type of coating has been completely rinsed from the tank before the second type of coating is added to the tank.

The mobile industrial painting system 4, as embodied in the coating operations vehicle 8, comprises dedicated equipment, e.g., pumps, compressors or generators. In the past, these have not been considered mobile or portable, but now, the same equipment is mounted for efficient use within the mobile vehicle 8. Accordingly, the system 4 comprises subsystems which facilitate routine care and maintenance without having to be moved from positions of operation. For example, systems are also provided on the vehicle 8 to service hydraulic paint sprayers used in conjunction with the tank dispensing system 200. Also, an in situ oil changing system 800 enables convenient changing of engine oil in hydraulic sprayers with the system 800 comprising an auxiliary reservoir system 100 provided to refill oil reservoirs in the machinery and to collect spent oil.

Figure 4:
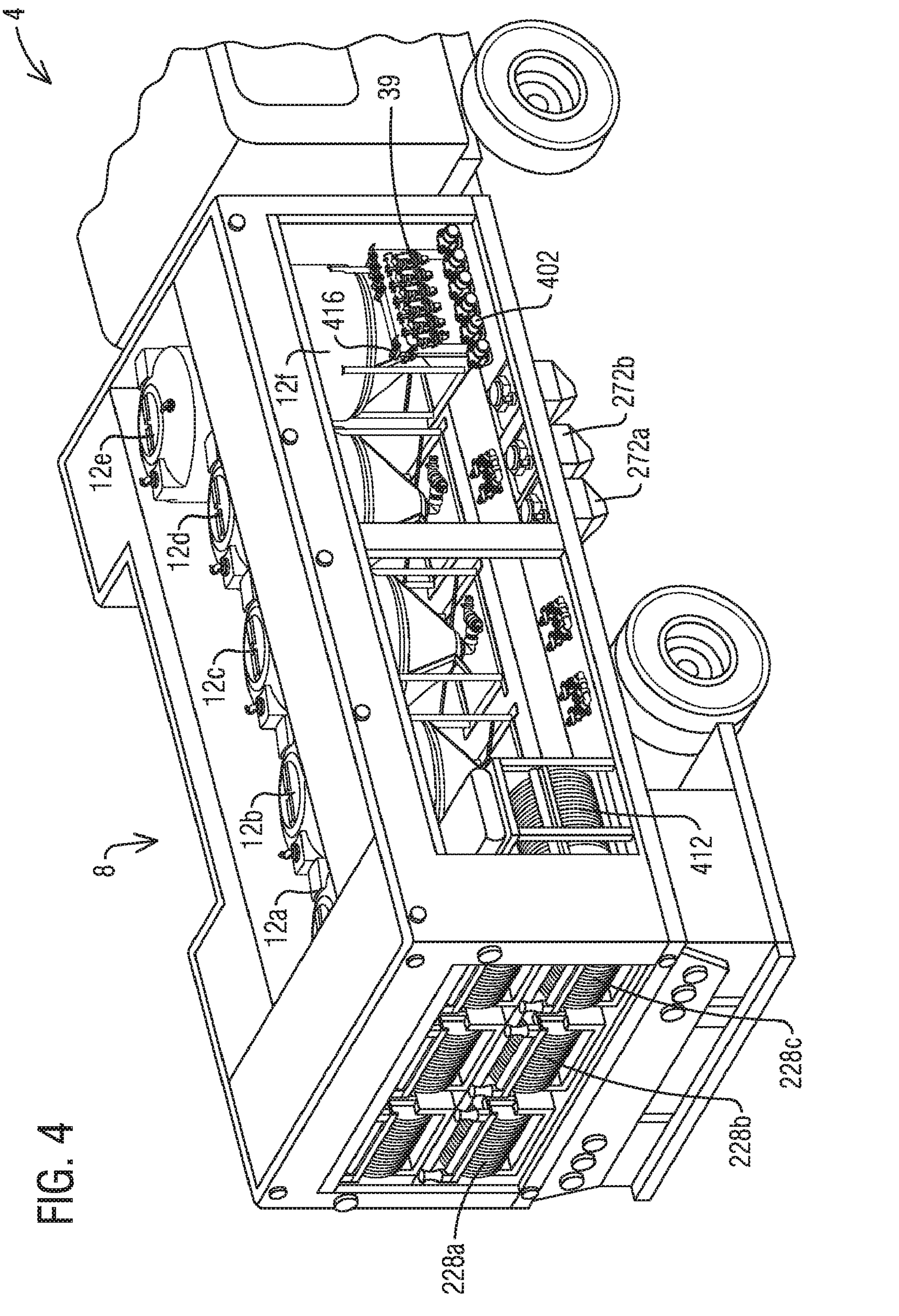
FIG. 4 is a side perspective view of the coating operations vehicle incorporating the system of FIG. 1.

FIG. 1 schematically illustrates a system 10 for dispensing paint into a series of tanks 12*a-f* on the coating operations vehicle 8, for high volume delivery during a painting operation involving multiple paint sprayers. As shown in FIG. 4, six tanks 12*a*-12*f* are positioned on the bed of the vehicle 8. Each tank 12 has an 85 gallon (~322 liter) capacity. The combined volume of the tanks 12 provides sufficient volume for a typical full work day of efficient painting while also affording flexibility to provide different kinds of paints and primers and other coatings, as well as paint of varied colors during the work day without having to refill the system. However, the tanks 12 are not limited to any particular tank size and the paint dispensing system 200 is not limited to any particular number of tanks mounted on the vehicle 8. The tank filling system 10 advantageously fills one or more of the tanks 12 with a coating prior to commencement of the coating project (e.g. at a job site or at a facility having the paint supply). The paint supply may, for example, be available in relatively small (e.g., five gallon size) containers or in large containers (sometimes referred to as totes) holding up to or over 250 gallons (~946 liters) of material.

FIG. 1 depicts the tank filling system 10 for performing a first phase of filling one or more of the tanks 12 mounted on the coating operations vehicle 8. In this example, multiple containers 24, such as multiple standard capacity (e.g., five-gallon) buckets of paint are provided in sufficient quantity to provide the vehicle with a sufficient volume of paint to fill the tanks as required for a job. If a project requires 300 gallons of a coating, then the contents of 60 standard capacity (e.g. five-gallon) containers 24 of coating are transferred into the tanks. The tank filling system 10 includes a siphon or draw tube 26 with a first end that is inserted into each five-gallon container 24 of paint. To minimize exposure of paint in the bucket to the air, the first end of the draw tube 26 is inserted through a conventional, relatively small cap opening in the lid of the container 24. A second end of the draw tube 26 is connected to an input of a draw pump 28. Multiple draw tubes 26*a* and 26*b*, may be simultaneously inserted into multiple containers 24*a* and 24*b* and simultaneously connected through one or more draw pumps 28 to effect delivery into the tanks 12. Although FIG. 1 depicts two draw tubes 26*a* and 26*b* simultaneously inserted into two containers 24*a* and 24*b* and simultaneously connected to the draw pump 28, more than two draw tubes 26 can be simultaneously inserted into more than two respective containers and simultaneously connected to the draw pump 28. In another example, each of the multiple draw tubes 26*a* and 26*b* can be connected to a different draw pump 28. As shown in FIG. 1, the draw pump 28 includes an output manifold with manifold lines 38*a*-38*f* leading to the tanks 12, with a series of fill valves 39*a*-39*f* each positioned in a manifold line to control flow to one of the respective tanks 12*a*-12*f*. An output hose 51 connects each fill valve 39 to an opening in a top of each tank 12. One or more fill valves are opened, depending on which of the tanks 12 are to be filled with paint from the containers 24. Multiple tanks can be simultaneously filled with paint when filling the multiple tanks with the same type of paint from containers 24. If paint of a first color from containers 24 is to be filled in tanks 12*a* and 12*b* only, only fill valves 39*a* and 39*b* are opened during the filling of the first color paint from containers 24. Similarly, if paint of a second color from containers 24 is to be filled in tanks 12*c* and 12*d*, only fill valves 39*c* and 39*d* are opened during the filling of the second color paint from containers 24. When paint of the first color from containers 24 is to be filled in tank 12*a*, only the fill valve 39*a* is opened. The fill valve 39*b* is kept closed until the first color paint is filled in tank 12*a*, after which the fill valve 39*b* is opened and fill valve 39*a* is closed wile the first color paint is filled in tank 12*b*. The fill valves are provided with tags 31 (FIG. 1) to identify a paint type or color for feeding each tank 12 as shown for one of the tanks in FIG. 1. For example, the tag 31 may associate a green paint color with a particular one of the tanks 12. Upon activating the draw pump 28, paint from the containers 24*a* and 24*b* is siphoned or pumped through draw tubes 26*a* and 26*b*, transferred through the open fill valves 39 and into those tanks 12 corresponding to the open fill valves.

In the exploded view shown in FIG. 2A, a draw tube filter arrangement 30 comprises an in-line filter 32 positionable within each of the draw tubes 26 of the system 10 so that, during operation of the tank filling system 10, a filter 32 is in the coating flow path of each draw tube to separate or remove debris or other material from the liquid coating passing from each container 24 and into a tank 12. During the tank filling operation, a first end 34 of the draw tube is positioned near or at the bottom of the container to draw the liquid coating. An opposing second end of the draw tube is connected to the draw pump 28 to send the coating through the pump and on to a tank 12.

The filter 32 is inserted into the draw tube 26 through the first end 34 which end has a first series of threads formed along an outside surface thereof. A removable spacer cap 32, having a bore of a first diameter extending there through, is attachable to the first end 34 of the draw tube. Attachment of the spacer cap 33 to the draw tube 26 is effected with mating engagement between a series of threads (not shown) formed along the surface of the bore and the threads of the draw tube first end 34. The filter 32, being generally cylindrical in shape, has opposing ends, one of which is positionable directly against a surface of the cap 33. The cap bore is of a relatively small diameter compared to the diameter of the end of the filter positioned against the cap 33.

The cap 33 may be threaded on to the draw tube first end 34. The filter 32 strains paint or other coating as it is drawn out of the paint container 24, i.e., to remove any unwanted contaminants or other material from the paint. The first end 34 of the draw tube 26 is positioned in the container 24 and the opposing second end is connected to the draw pump 28. During operations the cap 33 is in contact with a base surface of the container 24, but the grooves 36 prevent intimate or sealing contact about the cap bore opening with respect to the base surface of the container 24, which would lead to unwanted suction on the base of the container 24. In an example embodiment, the grooves 36 are orthogonal to one another, forming a cross about the draw tube opening.

After the paint has been pumped from each container 24 into one or more of the tanks 12, to avoid waste, residual paint remaining in individual containers 24 may be consolidated into a residual container, e.g., by pouring coating out of the containers which have been pumped out. Scraping the interior surface of the container 24 with a spatula to collect residuals may be a preferred method to optimally extract and transfer most of the residual coating into the residuals container for addition to the one or more tanks, e.g., by pumping coating out of the residuals container using the draw tube 26 and draw pump 28. Use of the tanks to consolidate the coating provides further improvement in cost efficiency, e.g., on the order of three to five or more percent. That is, approximately 4 gallons of residual paint are recoverable for every 100 gallons of paint drawn into the tanks 12. This rate of recovery also applies to relatively heavy coatings such as elastomeric paints which adhere to the side walls of the containers. This method also provides improvement in the time efficiency for applying the coating, in part because one worker can operate the tank filling system 10 to draw paint from the containers 24*a* and 24*b* into the one or more tanks 12 while, at the same time, another worker removes and consolidates residual paint into another container 24 for pumping into a tank 12.

After paint is drawn from each container 24 into the one or more tanks 12, if the levels of coating are at the desired levels, the first phase of the filling of the tanks 12 is complete. The levels of coating in the one or more tanks 12 may be visually monitored and the draw pumps 28 may individually be shut off when each level of paint in a tank 12 reaches the desired level. In another embodiment, a sensor 29 (see FIG. 1) is provided in each of the tanks 12 to monitor changes in levels of paint within the tanks 12. Although FIG. 1 only depicts the sensor 29 in the tank 12*f*, it is to be understood that similar sensors 29 may be provided in each of the tanks 12*a*-12*f*. Signals generated from the sensors 29 are applied to deactivate the draw pump 28 when the level of paint in the one or more tanks 12 reaches the desired level. For example, the desired level may be reached in an 85 gallon tank 12 when the paint level reaches a level corresponding to a volume in the range of 75-85 gallons (~75-322 liters).

Figure 3:
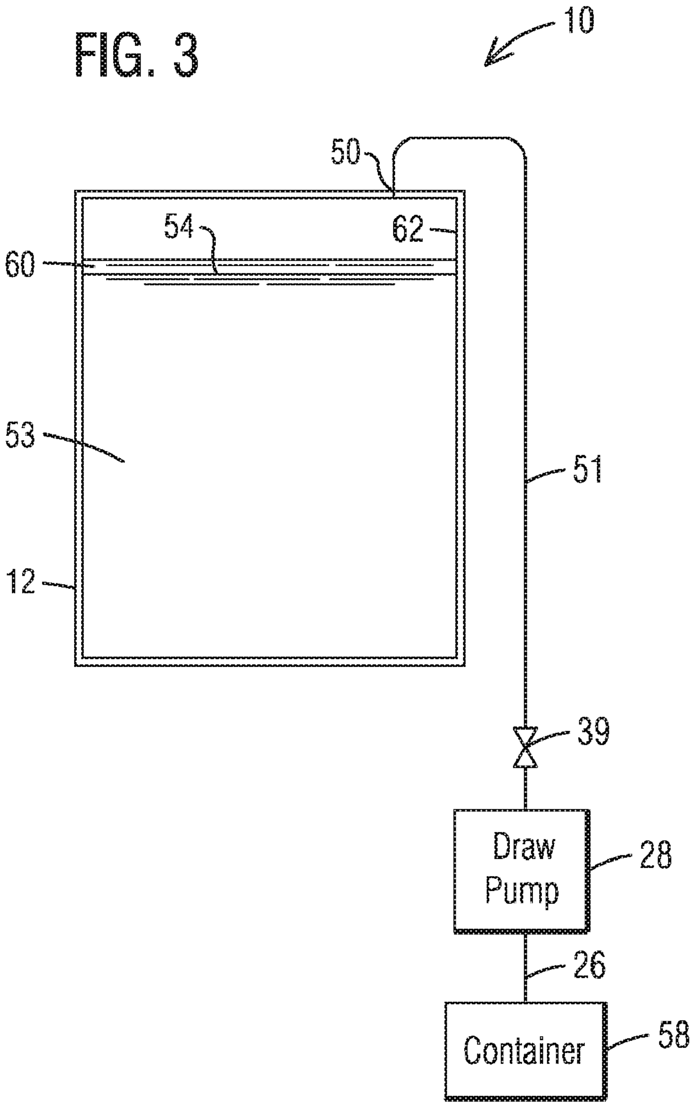
FIG. 3 is a partial view of the system presented in FIG. 1 showing components for filling an exemplary tank.

FIG. 3 illustrates a second phase of operation with the tank filling system 10 for filling a tank on the vehicle 8. Although one tank 12 is shown in the figure, it is to be understood that, for the illustrated embodiment, all tanks 12*a*-12*f* include this arrangement. After the paint 53 has been pumped into the tank 12 to a desired level 54, the draw tube 26 is inserted into a container of water, such as a standardized container 58 of water. The draw pump 28 is then activated to draw water from the container 58 which passes through the fill valve 39, into output hose 51 and into an opening 50 in the top of the tank 12. The water forms a layer 60 of water in the tank over the paint 53 since water has a lower density than paint. The layer 60 of water remains on top of the paint 53 within the tank 12. Advantageously, placing the layer 60 of water over the paint provides a form of a closed system for the paint 53, isolating the paint 53 from elements in the surrounding environment. This prevents the nozzle 612 on a spray gun 608 from receiving relatively thick or coagulated portions of paint from the tank 12 and thereby mitigates clogging. This permits continuous use of the spray gun 608 for longer time periods, improving productivity of coating applications.

Secondly, as paint 53 is pumped out of a tank having a water layer 60 over the paint, as the paint level in the tank 12 diminishes, the water layer 60 on top of the paint 53 continuously contacts, dilutes or washes an inside wall surface 62 of the tank 12 to help prevent formation of a skin of paint along the inside wall surface 62 of the tank 12. Otherwise, with formation and eventual breaking away of such a coagulated residue from the wall surface 62, there is an entry of debris into lines (e.g., hoses 230) leading to the spray guns 608, causing clogging in the spray nozzle 612. Third, if the operator of a spray gun 608 neglects to check the level of paint 53 in a tank 12, eventual ejection of water from the layer 60 through the sprayer nozzle 612 serves as an alert to refill the tank 12. This can prevent a pump that normally draws paint from the tank 12 from running dry and becoming damaged, thus avoiding major repair. This also overcomes a drawback in conventional systems which render use of a layer of water less desirable. A layer of water could be placed over the surface of a liquid coating in a five gallon container, but in a conventional method of drawing the coating directly from the bucket, normally the draw tube is always kept in the same container and, as the coating is pumped out, more coating is periodically added to the same container to replenish the container with new coating material. However, with this pouring of paint over the water layer 60, the water layer is no longer preserved as a layer on top of the coating material. Instead, pouring of more liquid coating over the water results in mixing and dilution of the liquid coating with the water.

Subsequently, to prevent the spray gun nozzle 612 from receiving relatively thick or coagulated portions of paint, even more water would have to be added on top of the new coating material to form a new layer of water over the new coating material added to the container. The tank filling system 10, having the layer 60 of water on top of the coating in the tank 12 does not result in this disadvantage. The layer 60 of water remains on top of the liquid coating placed in the tank throughout the process of drawing the coating down in the tank 12. There is no addition of further water or dilution of the coating.

In an example method, with different tanks 12*a*, 12*c* in the system 10 to be filled with different colors of paint, the first colored paint is initially pumped into the first tank 12*a*. Water is then pumped into the first tank 12*a* to form a layer 60 of water floating on top of the paint 53 and then pumping continues to clear the first color paint from the pump lines (e.g., the draw tube 26). The second color paint is then pumped into the second tank 12*c*, after which a layer 60 of water is pumped into the second tank 12*c* to float on top of the paint 53 as described above. This process can be repeated for each other tank.

The tank filling system 10 provides numerous advantages over conventional filling systems. By filling the paint into the one or more tanks 12 prior to commencement of spray painting, there is no need for workers to carry multiple containers of paint to various locations around a job site. Instead, after the paint is transferred into the tanks 12, the paint can be delivered to each of multiple painting locations with hoses stored on reels in the vehicle 8. Each hose may be extended 350 feet or farther from the tank to be dispensed, as discussed below.

Figure 5:
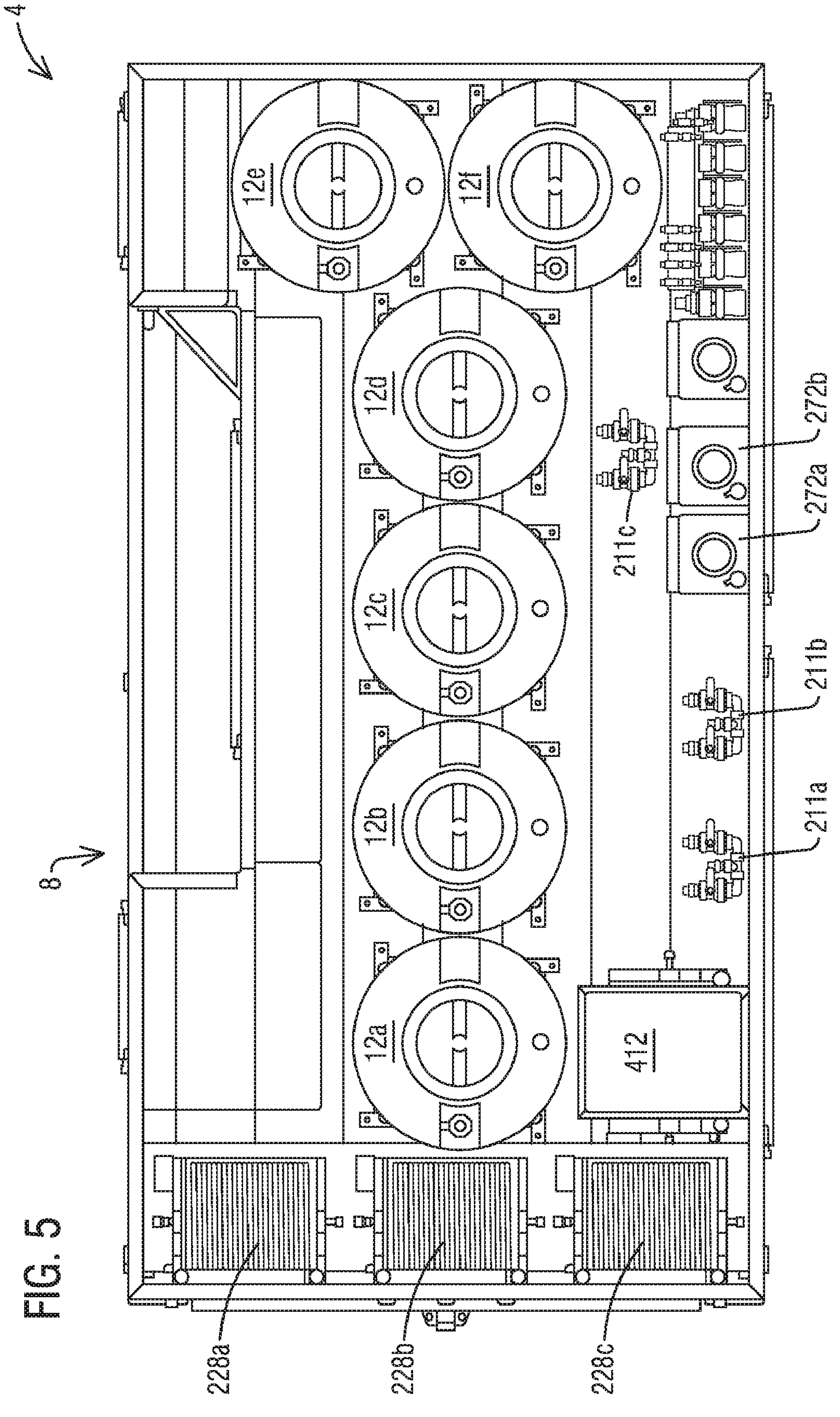
FIG. 5 is a view from above of the coating operations vehicle of FIG. 4.
Figure 6B:
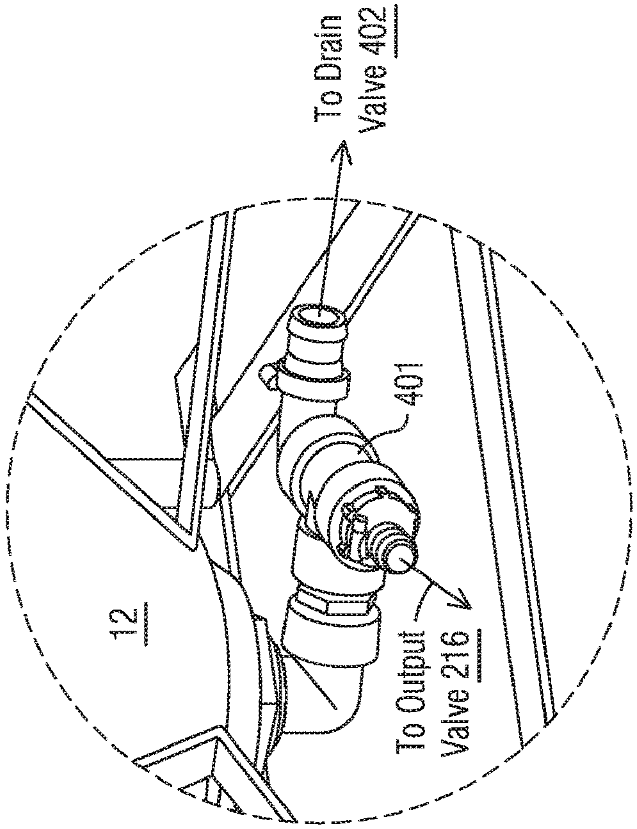
FIG. 6B is a side perspective view of an output manifold of the tank shown in FIG. 6A.
Figure 6A:
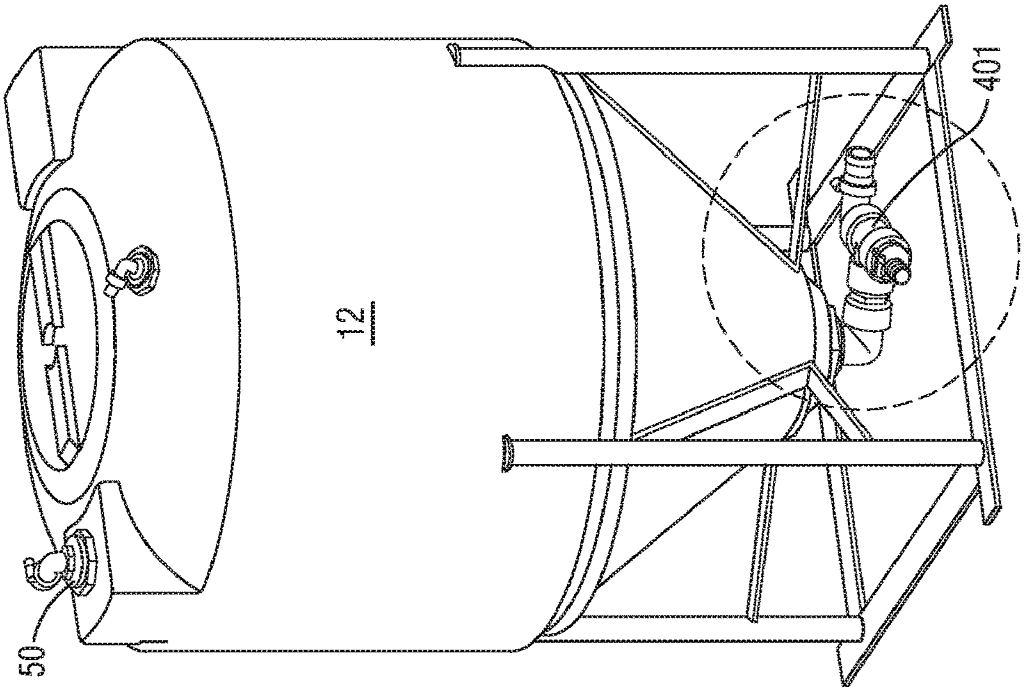
FIG. 6A is a side perspective view of a tank shown in FIGS. 1, 4 and 5.

FIG. 4 is a perspective elevation view, and FIG. 5 is a view from above, of the coating operations vehicle 8 illustrating portions of an embodiment of the system 10 installed thereon with six tanks 12*a*-12*f* mounted on a bed of the vehicle 8. The illustrated fill valves 39 are positioned in the manifold lines 38*a*-38*f* of the draw pump 28. Although six tanks are shown on the vehicle 8, the tank filling system 10 is not limited to having any specific number of the tanks 12. FIG. 6A depicts the opening 50 in the top of the tank 12 where the output hose 51 is connected as an input to the tank, as shown in FIGS. 1 and 3.

Figure 7:
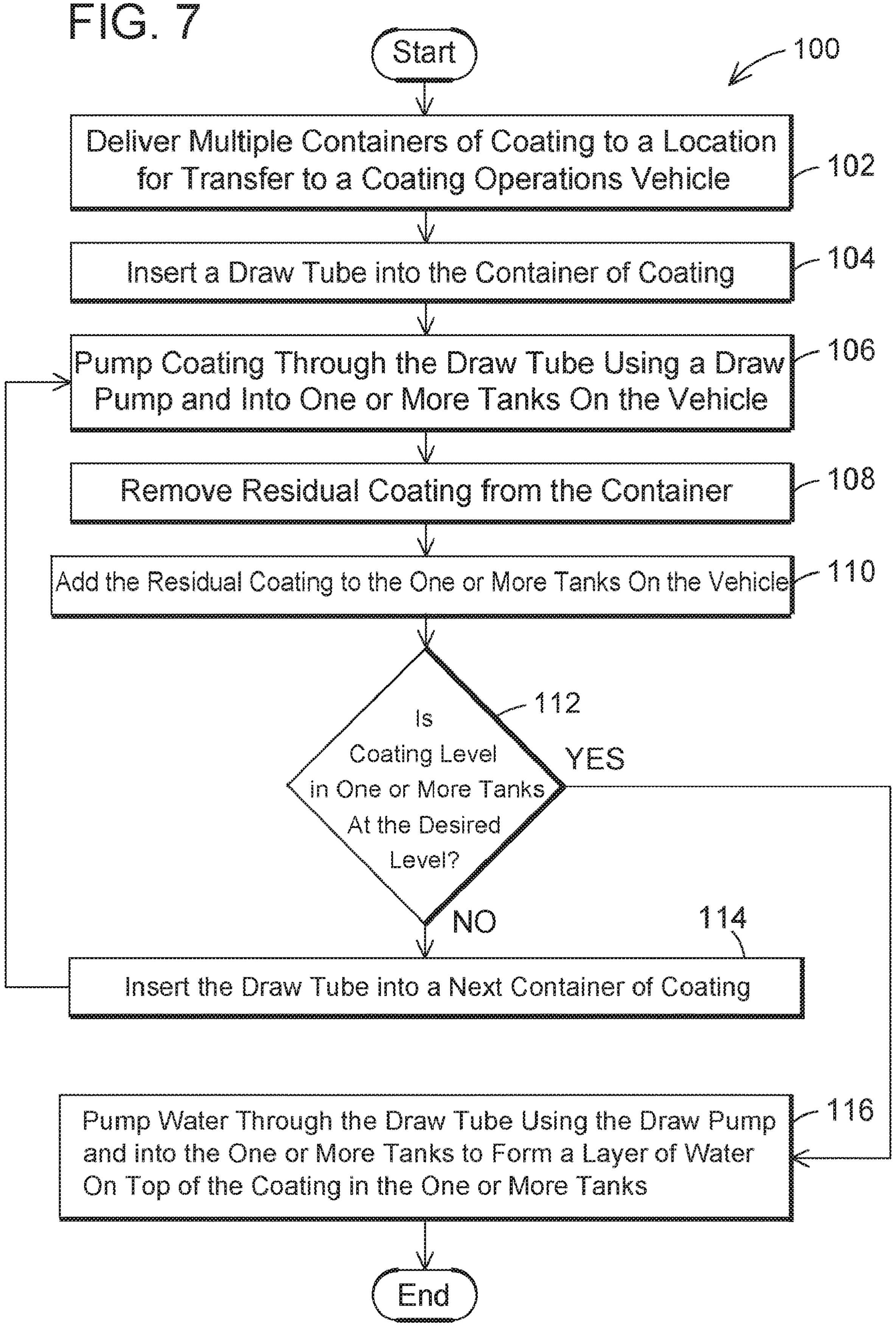
FIG. 7 illustrates a method for filling tanks on the coating operations vehicle with liquid coating.

FIG. 7 is an example flow diagram of a method 100 for filling tanks 12*a*-12*f* on the vehicle 8. In step 102, multiple containers 24 are at a location for transfer into the coating operations vehicle 8. The vehicle may be located at a job site when filling the tanks or may be brought to a supply center remote from the job site, such as the warehouse of a paint supplier. The paint supply may, for example, be available in relatively small (e.g., five gallon size) containers or in large containers (sometimes referred to as totes) holding up to or over 250 gallons of material.

In step 104, the first end of the draw tube 26, having the spacer cap attached thereto, is inserted into each container 24 of paint or into the large container (tote) of paint. With this insertion, the base of the container 24 is in contact with the surface of the spacer cap 33 having grooves formed therein. Use of the cap 33 having the grooved surface when inserting the draw tube 26 prevents unwanted suction on the base of the container 24 because grooves 36 on the cap 33 permit more enhanced flow of liquid coating into the draw tube when contact between the draw tube and the base of the container would otherwise impede flow. Multiple draw tubes, e.g., tubes 26*a* and 26*b* may be simultaneously inserted into multiple containers 24*a* and 24*b* of paint.

In step 106, paint is pumped through the draw tube 26 using the draw pump 28 and into one or more tanks 12 on the vehicle 8. In an example embodiment, this includes straining the paint through the draw tube 26 to remove unwanted contaminants from the paint based on the in-line filter 32 positioned within the draw tube 26. Paint is simultaneously pumped through the multiple draw tubes 26*a* and 26*b*, that are simultaneously inserted into the multiple containers 24*a* and 24*b*, with the draw pump 28 and into one or more tanks 12. In an example embodiment, the draw pump 28 is capable of pumping the coating material at a minimum rate of five gallons per minute. In one example, the draw pump 28 is capable of pumping the coating material from the container 24 into the manifold lines 38 at a rate of 5 gallons in 45 seconds. The pump 28 may be an air-operated diaphragm pump of the type driven by an air compressor. The pump 28 may have a one inch diameter intake bore. Suitable equipment is available from Price® Pump (Sonoma Ca). The compressor may be a model SS3 or SS5 from Ingersoll Rand (Davidson, N.C.).

In step 106 multiple fill valves 39 may be simultaneously opened to pump coating into multiple tanks 12. The fill valves 39 may be provided with paint tags 31 that identify the specified coating material by type or color that each tank 12 is to receive. The operator may, however, only open one fill valve 39 at a time to sequentially fill each tank 12 one at a time.

In step 108, after coating is pumped out of a container, residual paint left in the container is removed. This may include manually scraping an interior of the container 24 with an instrument, such as a spatula. The removal step 108 may be performed on a first set of pumped-out containers **24*a* and 24*b* while step 106** is being simultaneously performed to pump coating out of a second set of containers full of coating material.

In step 110 the residual paint removed from the container 24 in step 108 is added to the one or more tanks 12. This step may include collecting residual paint from each container 24, according to step 108, into one residual container and then pumping the residual paint from the residual container using the draw tube 26 and draw pump 28.

According to step 112, a determination is made whether the level of paint in the one or more tanks 12 is at the desired, e.g., predetermined, level 54. This step 112 may be performed by visual inspection or performed with use of the sensors 29 positioned in each tank 12, the sensors each providing a signal that controls operation of the draw pump 28. Step 112 need not be performed after step 110 and the determination of step 112 may be performed while pumping coating into a tank (step 106) such that the tanks 12 are continuously monitored during step 106 to determine whether a desired fill level has been reached, in which case the draw pump is deactivated during. When step 112 indicates a positive determination, the tank filling method 100 proceeds to step 116. If step 112 results in a negative determination, the method 100 proceeds to step 114.

In step 114, the draw tube 26 is sequentially inserted into next sets of containers **24*a* and 24*b* of coating material and the method 100 proceeds to step 106 if the next set of containers 24*a* and 24*b* of paint has the same type of paint as the previous set of containers 24*a* and 24*b*** of paint.

In step 116, the draw tube 26 is inserted into the container 58 of water and water is pumped using the draw pump 28 from the container 58 into the one or more tanks 12 to form the layer 60 of water on top of the paint 53 in the filled tank. One to two gallons of water may be pumped into each tank 12 to form layers 60. However, the amount of water pumped in step 116 is not limited to any specific quantity and may be of sufficient quantity to also assure that the hydraulic sprayer 210 (discussed below) does not run dry, e.g., prior to an operator observing discharge of water or watery paint through a spray gun connected to an emptied tank.

Step 102 may include providing containers 24 of a first color or type of coating (first material), a second color or type of coating (second material) and a third color or type of coating (third material) at a vehicle location. Steps 104-112 provide pumping the first material type through the draw tubes 26 using the draw pump 28 and into tanks **12*a* and 12*b* until the level of the first material type in the tanks 12*a* and 12*b* is at the desired level 54. Step 116 includes pumping water through the draw tubes 26 using the draw pump 28 and into the tanks 12*a* and 12*b* to form the layer 60 of water in the tanks 12*a* and 12*b* and to clear the draw tubes 26 and the draw pump 28 of the first paint. In this example embodiment, steps 104-112 are next performed to pump the second material through the draw tubes 26 using the draw pump 28 and into the tanks 12*c* and 12*d* until the level of second material type in the tanks 12*c* and 12*d* is at the desired level 54. Step 116 includes pumping water through the draw tubes 26 using the draw pump 28 and into the tanks 12*c* and 12*d* to form the layer 60 of water in the tanks 12*c* and 12*d* and to clear the draw tubes 26 and the draw pump 28 of the second material type. In this example embodiment, steps 104-112 are next performed to pump the third material type through the draw tubes 26 using the draw pump 28 and into the tanks 12*e* and 12*f* until the level of third material type in the tanks 12*e* and 12*f* is at the desired level 54. In the example embodiment, step 116 includes pumping water through the draw tubes 26 using the draw pump 28 and into the tanks 12*e* and 12*f* to form the layer 60 of water in the tanks 12*e* and 12*f*. Although an example embodiment includes sequentially pumping coating material of a first material type, a second material type and a third material type into the tanks 12*a* and 12*b*, the tanks 12*c* and 12*d*, and the tanks 12*e* and 12*f*, respectively, the example embodiment is not limited to this arrangement and fewer or more coating materials may be pumped into one or more of the tanks 12**.

Figure 8:
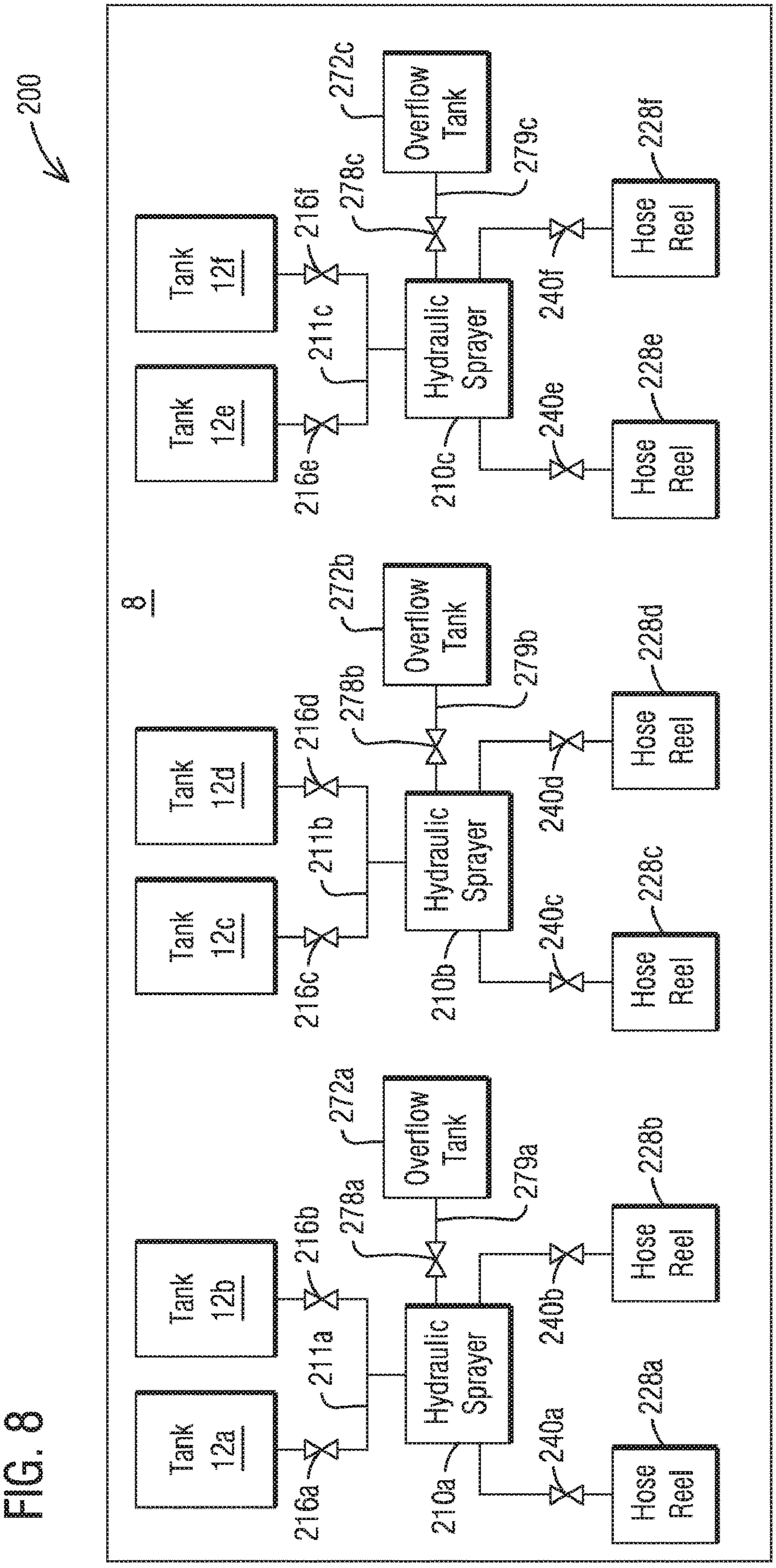
FIG. 8 is a schematically illustrates a system for dispensing liquid coating from tanks on the coating operations vehicle.

FIG. 8 illustrates an embodiment of the system 200 for dispensing paint from tanks **12*a*-12*f* on the vehicle 8 With the tanks 12 filled with coating material according to the tank filling method 100, spray gun operators may arrive at the job site and commence painting upon arrival with the tank dispensing system 200**, and without having to perform conventional preliminary steps, e.g., such as carrying and placing containers of paint at various locations around the job site, filling up containers of paint or moving paint sprayers around the job site.

Figure 10:
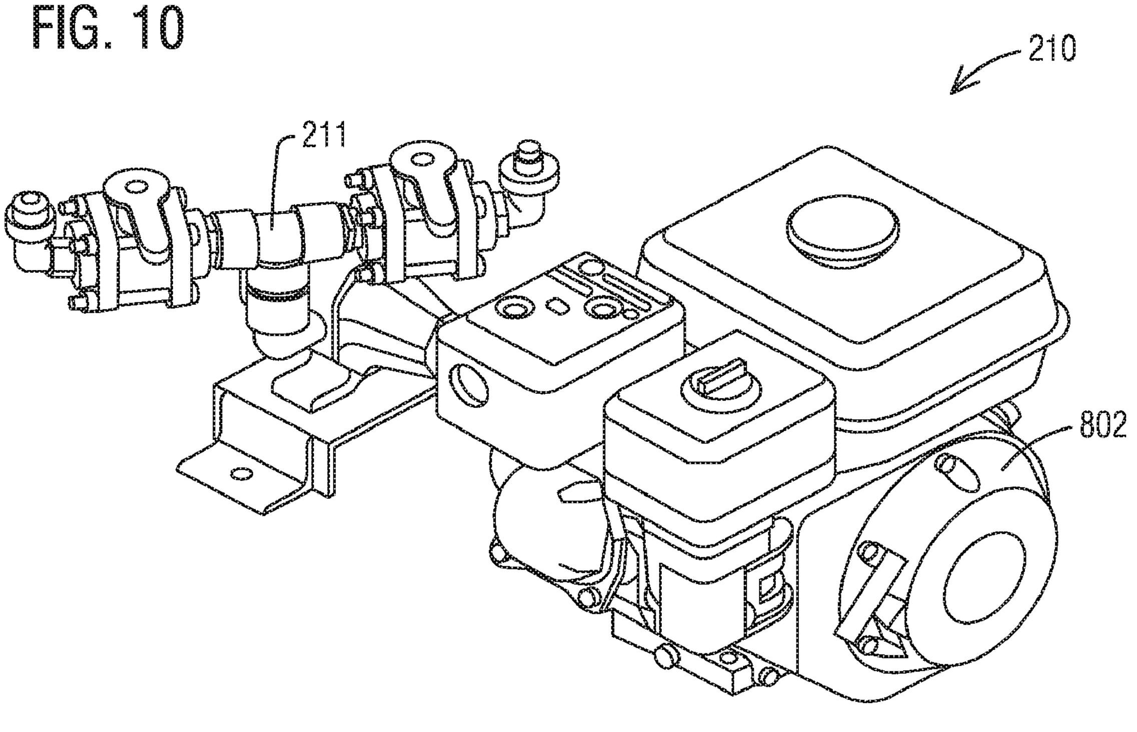
FIG. 10 is a perspective view of a hydraulic spray unit in the dispensing system of FIG. 8.

The illustrated tank dispensing system 200 includes multiple hydraulic sprayers **210*a*-210*c*, each connected to a pair of tanks (12*a*, 12*b*), (12*c*, 12*d*), (12*e*, 12*f*) through a different one of three input manifolds 211*a*-211*c*. Where appropriate, the system 200 is described with reference to the hydraulic sprayer 210*a* and tanks 12*a*,12*b* while the description applies to the other hydraulic sprayers 210*b* and 210*c* and tank sets (12*c*, 12*d*)and (12*e*, 12*f*). FIG. 10 provides a perspective view of an exemplary hydraulic sprayer 210 powered with a gasoline engine 802 having a seven gallon gas tank. Other types of paint sprayers can be used in the tank dispensing system 200. The illustrated configuration of the tank dispensing system permits the engine in each hydraulic sprayer to run uninterrupted for an entire work day, e.g., for eight hours. Feed lines connecting the tanks (12*a*, 12*b*) to the hydraulic sprayer 210*a*** have an inside diameter in a range of ⅜" to ¼".

Figure 9:
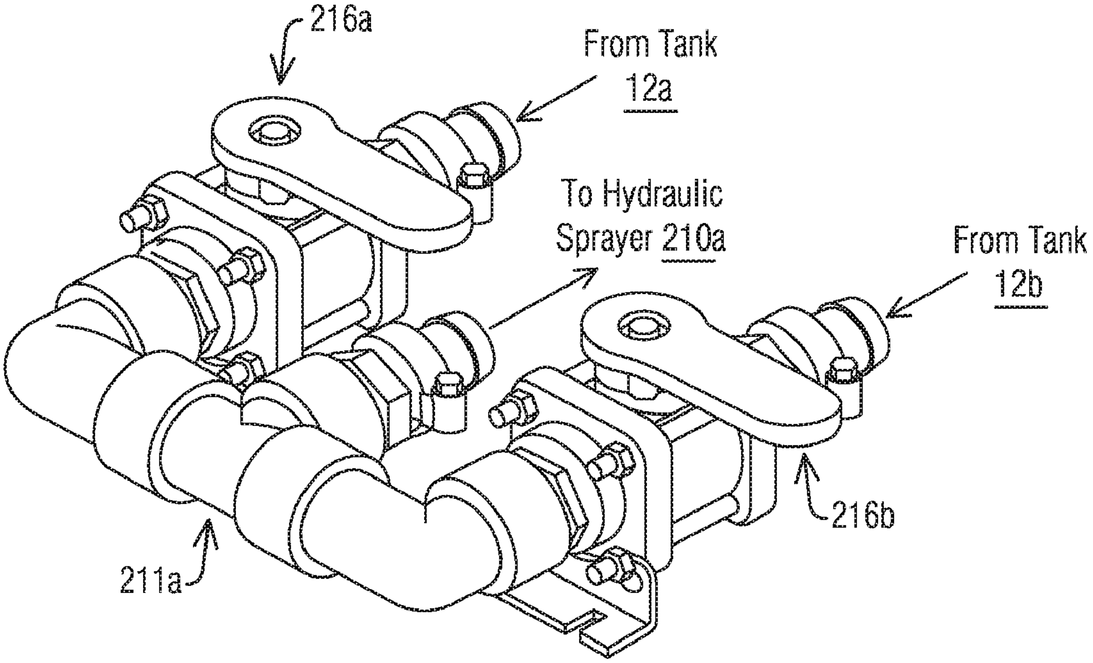
FIG. 9 is a front perspective view of an intake manifold in the dispensing system of FIG. 8.

Each tank (**12*a*, 12*b*) includes a respective tank output valve 216*a*, 216*b*. Referring to FIGS. 6A-6B, each tank 12 includes an output line 401 coupled to direct coating output from each tank 12 either through an output valve 216, for entry to an input manifold 211, or through a drain valve 402. The input manifold 211 is, generally, a multi-port input manifold to a hydraulic sprayer 210. In the illustration the manifold is connected to a pair of tank output valves 216 to selectively receive paint from one or more of the tanks 12** depending on whether the output valve 216 of each respective tank 12 is open. When the output valve 216*a* is open and the output valve 216*b* is closed, the input manifold 211*a* only draws paint from the tank 12*a*. When the output valves 216*a*, 216*b* are both open, the input manifold 211*a* draws paint from both tanks 12*a* and 12*b*. As shown in FIG. 8, the input manifold 211 merges flow received from two output valves 216 e.g., a "T" input, for flow into one hydraulic sprayer 210. The top perspective view of the intake manifold 211 shown in FIG. 9 illustrates the two inputs of an intake manifold 211 which receives paint from the tanks 12*a*, 12*b*. The output valves 216*a*, 216*b* are opened or closed, depending on whether coating from one or both of the tanks 12*a*, 12*b* is to be passed into the sprayer 210*a*, i.e., through the intake manifold 211*a*. The input manifolds 211*b*, 211*c* may have the same configurations as the input manifold 211*a*. In an example embodiment, if both tanks 12*a*, 12*b* hold coating material of the same color or type, both tank valves 216*a*, 216*b* may be opened to maximize a flow rate of coating material through the hydraulic sprayer 210*a*. The output valves 216*c*, 216*d* of the tanks (12*c*, 12*d*) are connected with the intake manifold 211*b* and the output valves 216*e*, 216*f* of the tanks (12*e*,12*f*) are connected with the intake manifold 211*c* in a similar manner as the output valves 216*a*, 216*b* are connected with the intake manifold 211*a*.

The multiple hydraulic sprayers 210*a*-210*c* each include a pair of output lines each connected to a hose 230 on a hose reel (228*a*, 228*b*), (228*c*, 228*d*), (228*e*, 228*f*), providing a two output manifold hose configuration where each of two hoses 230 is stored on a separate reel 228. The term hose reel refers to a frame on which a hose 230 is stored and on which connections to the hose 230 may be effected through fittings mounted on the frame associated with the reel 228. However, a hose may be connected directly to a sprayer 210 and simply wound on a reel 228. As indicated in FIG. 5, the hose reels 228 are stored in a rear portion of the coating operations vehicle 8. The output configuration of the tank dispensing system 200 described for the hydraulic sprayer 210*a* and hose reels (228*a*, 228*b*) is exemplary of corresponding configurations for the hydraulic sprayers 210*b*, 210*c* and associated hose reels (228*c*,228*d*), (228*e*,228*f*).

For the hydraulic sprayer 210*a*, each hose reel (228*a*, 228*b*) includes an input valve 240*a* and 240*b* connected to receive flow from the sprayer 210*a*, i.e., providing a sprayer output manifold having two hoses 239 (hose lines) connected to simultaneously operate two spray guns. When both input valves 240*a* and 240*b* are open, the hydraulic sprayer 210*a* delivers paint to hose lines in both hose reels 228*a* and 228*b*. If one input valve 240*a* is open and the other input valve 240*b* is closed, the hydraulic sprayer 210*a* only delivers paint to the hose reel 228*a* with the open input valve 240*a*. In one example, an input valve 240, for hose reel 228 may be closed if the hose reel 228 is not in use or becomes inoperable, e.g., in the event of a blown hose line. A first end of each hose reel 228 is connected to the input valve 240 to receive the paint, and an opposing second end of each hose reel 228 is attachable to a spray gun 608 shown in FIG. 19. In an example embodiment, the hose reels 228 have inside diameters in a range of ⅜"-½".

Although the arrangement of the tank dispensing system shown in FIG. 8 illustrates six tanks 12*a*-12*f*, three hydraulic sprayers 210*a*-210*c* and six hose reels 228*a*-228*f* on the vehicle 8, numerous other arrangements are contemplated. The coating operations vehicle 8 may include less than or more than six tanks 12, fewer or more than three hydraulic sprayers 210, and fewer or more than six sets of hose reels 228 and hoses 230. In other configurations there may be a single tank 12, or more than two tanks, connected to each hydraulic sprayer 210 through output valves 216, with the manifold 211 comprising two, three or more input ports.

In other embodiments the configuration of the tank dispensing system 200 may provide one hose reel 228 and one hose 230, or more than two hose reels 228 and hoses 230 connected to each hydraulic sprayer 210 through different input valves 240. Each hydraulic sprayer 210 may be connected to hoses 230 of varying lengths, such as one or more relatively short hoses (i.e., hoses of a first length) for use at locations close to the vehicle 8 and one or more longer lengths hose reels (i.e., hoses of a second length) for use at locations more distant from the vehicle. In this example embodiment, the first length is in a range of 150' to 400' and the second length is in a range of 250' to 400'.

Figure 11:
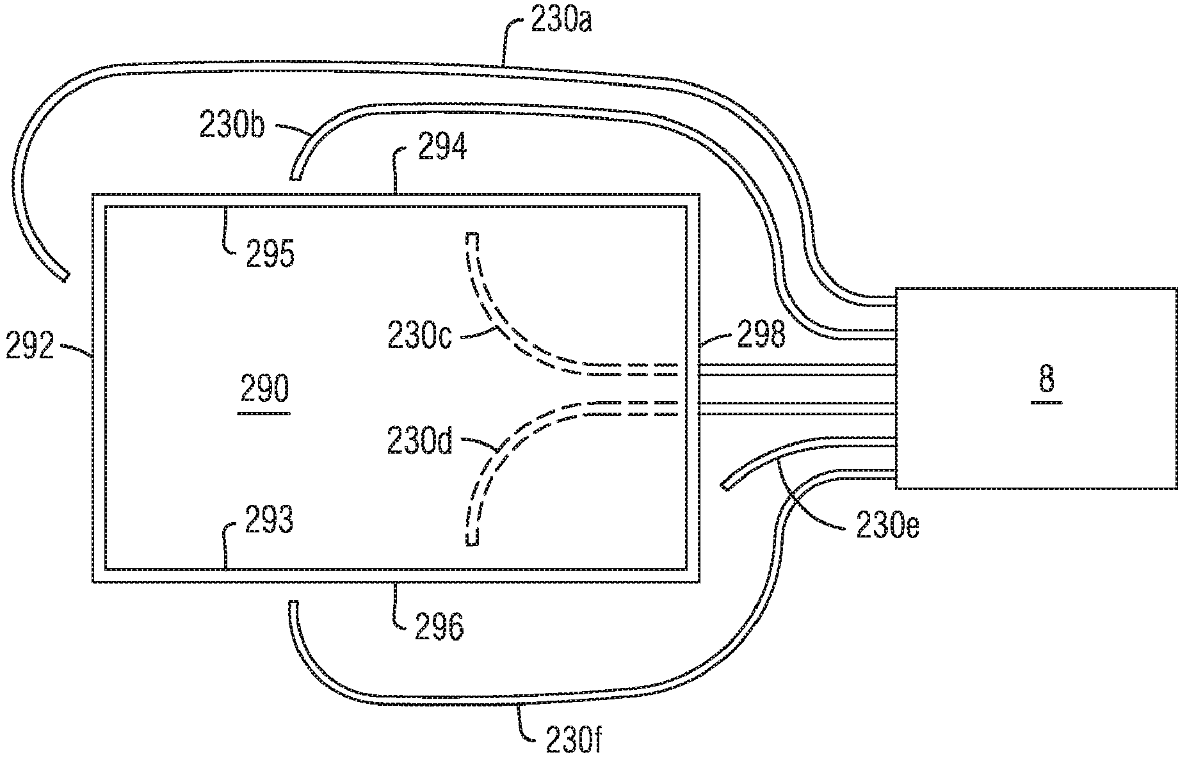
FIG. 11 schematically illustrates a plurality of hoses in the system of FIG. 8 shown extended to reach a plurality of locations about a job site.

During use of the tank dispensing system 200, the number of tanks 12 providing paint to the hydraulic sprayers 210 is determined by the settings of the output valves 216; and the number of hoses 230 receiving paint for spraying, from the hydraulic sprayers 210, is determined by the settings of the input valves 240 shown in FIG. 8. Each hose 230 is of sufficient length that it can be extended from the vehicle 8 to a desired location at the job site to spray paint. In an example embodiment, generally, the lengths of the hoses may be up to 400 feet (~122 meters) or more. FIG. 11 illustrates a plurality of hoses 230*a*-230*f* of the tank dispensing system 200 extended to a plurality of locations around a job site. The multiple hoses 230 can be simultaneously extended from the coating operations vehicle 8 to multiple locations around the job site requiring painting, so multiple workers can simultaneously spray paint delivered from multiple tanks 12*a*-12*f* through different hoses. For example, four of the hoses 230*a*, 230*b*, 230*e*, and 230*f* are shown extended from the vehicle 8, each to one of the surfaces 292, 294, 296, 298 on different sides of the building 290, to simultaneously spray paint the surfaces on the different exterior sides of the building. At the same time, two hoses 230*c*, 230*d* are extended from the vehicle 8 to different locations within an interior of the building 290 to spray paint interior surfaces 293, 295 on different interior sides of the building 290. Thus a combination of six interior and exterior surfaces may be simultaneously painted about a building with the tank dispensing system 200. Similarly, the system 200 can simultaneously apply coating material to interior or exterior surfaces on different buildings.

Still referring to FIG. 8, each hydraulic sprayer 210*a*-210*c* is connected to an overflow tank 272*a*-272*c* through an overflow line 279*a*-279*c* with flow to the overflow tanks controlled by a primer valve 278*a*-278*c*. The overflow tanks 272 are each secured in respective recesses 284 in a side of the vehicle 8.

Figure 12:
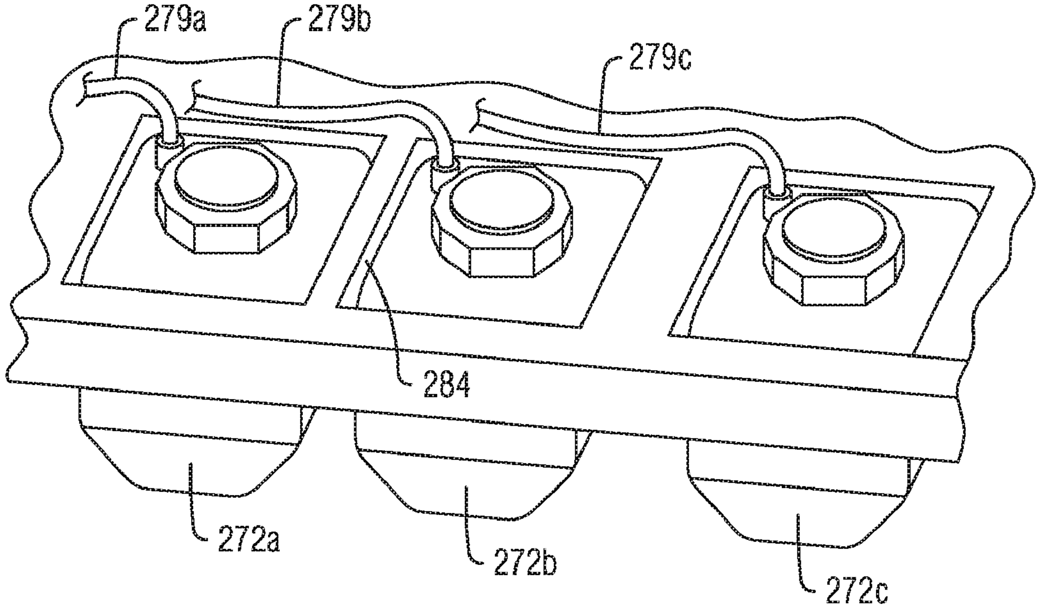
FIG. 12 is a front perspective view of an overflow tank in the system of FIG. 8.

Noting that the hydraulic sprayer 210 would normally operate at a high pressure, e.g., 3000-4000 psi, with the hydraulic sprayer 210 off, when the primer valve 278 is opened to slowly release high pressure within feed lines between the tanks 12 and/or the hoses 230 and the hydraulic sprayer 210, paint within the feed lines is sent into an overflow tank 272. Referring to the front perspective view of the overflow tanks 272*a*-272*c* shown in FIG. 12, the overflow tanks 272 are each secured within a recess 284 in a side of the vehicle 8. The overflow lines 279 are secured to dispense overflow through an intake port in the top of each overflow tank 272, providing the advantage of eliminating the need for each worker to have an overflow container to release pressure from the hose line. With the overflow tanks

272 and overflow lines 279 secured, these components remain stable when subjected to high pressures present in the feed lines.

During use of the paint dispensing system 200, when tanks 12*a* and 12*b* hold coating material of the same color or type the output valves 216*a* and 216*b* of tanks 12*a* and 12*b* shown in FIG. 8 are in the open position to maximize the flow rate of paint of that color or type through the hydraulic sprayer 210*a* and through the hoses 230*a* and 230*b*. When the paint color or type in one or both of tanks 12*a* and 12*b* is subsequently changed, the feed lines between the tanks 12*a* and 12*b* and the hydraulic sprayer 210*a* and between the hydraulic sprayer 210*a* and the hoses 230 are cleared before the new color or coating type is passed through the feed lines. The feed lines are cleared by the system 400 discussed below.

Figure 13:
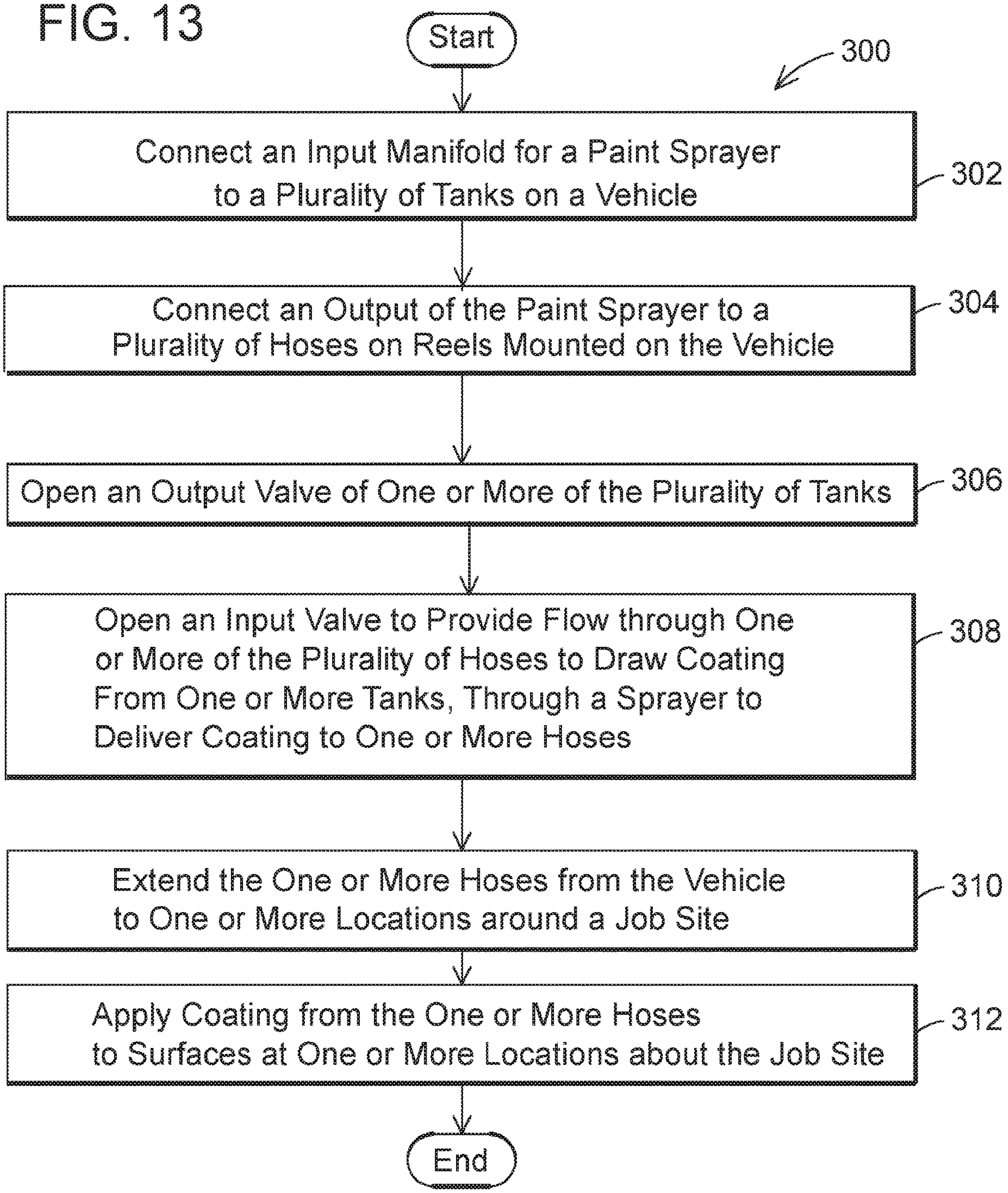
FIG. 13 illustrates an exemplary method for dispensing a liquid coating from tanks on the coating operations vehicle.

In accord with the example embodiment of FIG. 8, FIG. 13 illustrates a method 300 for dispensing paint or another coating type from tanks 12 on the vehicle 8.

In step 302, the input manifold 211 of a paint sprayer 210 is connected to multiple tanks, e.g., tanks 12*a* and 12*b*. The input manifold 211*a* of a first paint sprayer 210*a* is connected to a first plurality of tanks 12*a* and 12*b* and the input manifold 211*b* of a second paint sprayer 210*b* is connected to a second plurality of tanks 12*c* and 12*d* on the vehicle 8, where the first and second plurality of tanks 12*a*-12*d* have been filled with coating to a desired level 54.

In step 304, an output of the paint sprayer 210 is connected to the plurality of hoses, e.g., including hoses 230*a* and 230*b* on reels 228*a* and 228*b*, which are mounted on the vehicle 8. The output of the first paint sprayer 210*a* is connected to a first plurality of hoses 230*a* and 230*b* and the output of the second paint sprayer 210*b* is connected to a second plurality of hoses 230*c* and 230*d* on the vehicle 8.

In step 306, with the sprayer operating to create pumping action, the output valves 216 of certain ones of the one or more of the tanks 12 are opened, e.g., based on determination as to which tanks 12 the coating is to be drawn from, causing the coating to pass through the input manifold 211. If paint should be drawn from both tanks in an intake manifold, e.g., tanks 12*a* and 12*b*, both output valves 216*a* and 216*b* are opened. If paint should only be drawn from one tank 12, then only the output valve 216 controlling flow from that tank 12 is opened. Step 306 includes opening the output valves 216*a*, 216*b* of one or more of the first plurality of tanks, e.g., comprising tanks 12*a* and 12*b* and may further include opening the output valves 216*c* and 216*d* of one or more of the second plurality of tanks, e.g., comprising tanks 12*c* and 12*d* and may further include opening the output valves 216*e* and 216*f* of one or more of a third plurality of tanks, e.g., comprising tanks 12*e* and 12*f*.

In step 308, with the sprayer 210 operating, the input valves 240 of applicable hoses 230 controlling flow through the hoses are opened, e.g., input valves 240*a* and 240*b* are opened to supply coating material through the hoses 230*a* and 230*b* from the pumping action of the hydraulic sprayer 210*a*. When coating is to be delivered through both hoses 230*a*, 230*b*, both input valves 240*a* and 240*b* are opened. When coating is only to be delivered to one hose 230, then only the input valve 240 for that hose is opened. Step 308 includes opening the input valves 240*a* and 240*b* in the one or more of the first plurality of hoses 230*a* and 230*b* and opening the input valves 240*c* and 240*d* in one or more of the second plurality of hoses 230*c* and 230*d*.

As a result of opening each of the input valves 240, paint is drawn from one or more tanks 12, through an intake manifold 211 and into one or more paint sprayers 210. For example, paint may be drawn from one or more tanks 12*a* and 12*b*, through the intake manifold 211*a* and into the first paint sprayer 210*a*, and paint may be drawn from one or more tanks 12*c* and 12*d*, through the intake manifold 211*b* into the second paint sprayer 210*b*.

Also in accord with step 308, paint reaching the paint sprayer is pumped to one or more of the hoses 230 based on selective opening of input valves 240. For example, paint may be pumped from the first paint sprayer 210*a* and into one or more of the hoses 230*a* and 230*b*, and paint may be pumped from the second paint sprayer 210*b* and into one or more of the hoses 230*c* and 230*d*.

Referring next to step 310 and FIG. 11, the hoses 230 are extended from the reels 228 to locations around an exterior of the building 290 and to locations within an interior of the building 290.

As indicated in step 312, coating is then sprayed from the one or more hoses 230 positioned at the one or more locations, e.g., from one or more of the first hoses 230*a* and 230*b* and from one or more of the second hoses 230*c* and 230*d*. See, again, FIG. 11, which illustrates positioning for spraying on exterior surfaces 292, 294 of the building 290 and on interior surfaces 293, 295 within the building 290.

Figure 14:
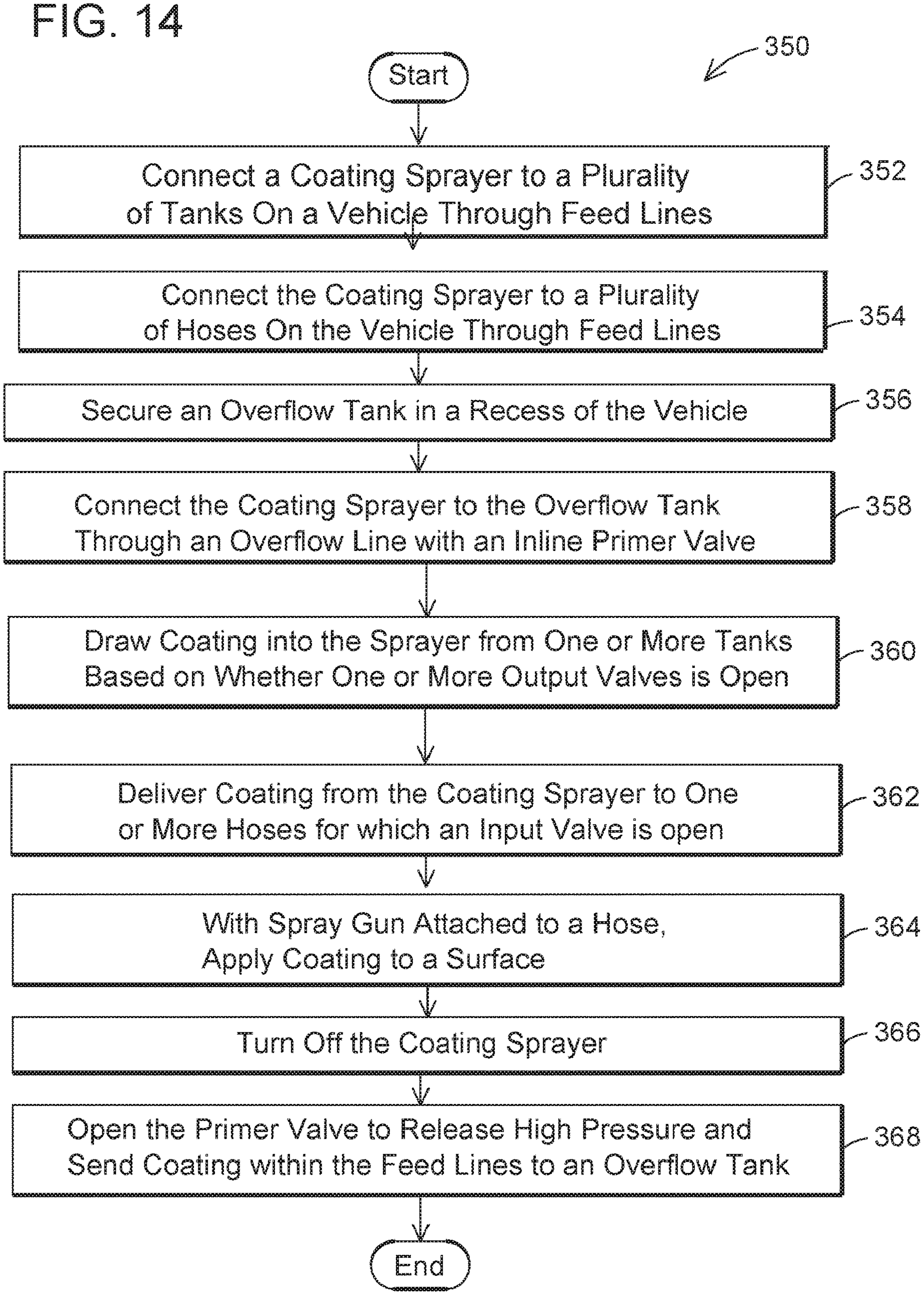
FIG. 14 illustrates another exemplary method for dispensing a liquid coating material from tanks on the coating operations vehicle.

FIG. 14 illustrates steps in an exemplary embodiment of a method 350 for dispensing paint from tanks 12 on the coating operations vehicle 8. As described in Step 352, a coating sprayer 210 mounted on the coating operations vehicle is connected through feed lines to a plurality of tanks 12. Next, the coating sprayer 210 is connected through a series of feed lines to a plurality of hoses 230. See Step 354. In step 356, the overflow tanks 272 are secured to the vehicle 8.

In step 358, each sprayer 210 is connected to an overflow tank 272 through an overflow line 279 having an in-line primer flow control valve 278. The overflow line 279 is shown connected to an intake port in a top of the overflow tank 272. See FIG. 11. Generally, the paint sprayer's 210*a*-210*c* may be connected to the overflow tanks 272*a*-272*c* through the overflow lines 279*a*-279*c* by opening in-line primer valves 278*a*-278*c*.

In Step 360, with the sprayer 210 operating, coating can be drawn from one or more tanks to the sprayer when the associated in-line output valve 216 is in an open position. In Step 362 with one or more input valves 240 in open positions, coating is pumped from the sprayer 210 to one or more hoses 230. Next, with at least one spray gun 608 connected to at least one hose, in Step 364 at least one operator applies paint to a surface. In step 366, when all of the one or more operators, drawing coating from the same sprayer 210, cease applying all coating from the sprayer 210, pumping action in each such sprayer is turned off, e.g., after completion of step 364, which may correspond to completion of a work session. Step 368, one or more of the primer flow control valves 278*a*-278*c* are opened to release pressure and coating present (i) within feed lines between the tanks 12 and hydraulic sprayers 210 or (ii) within feed lines between the hoses 230 and hydraulic sprayers 210, to send material to the overflow tank 272.

Figure 15:
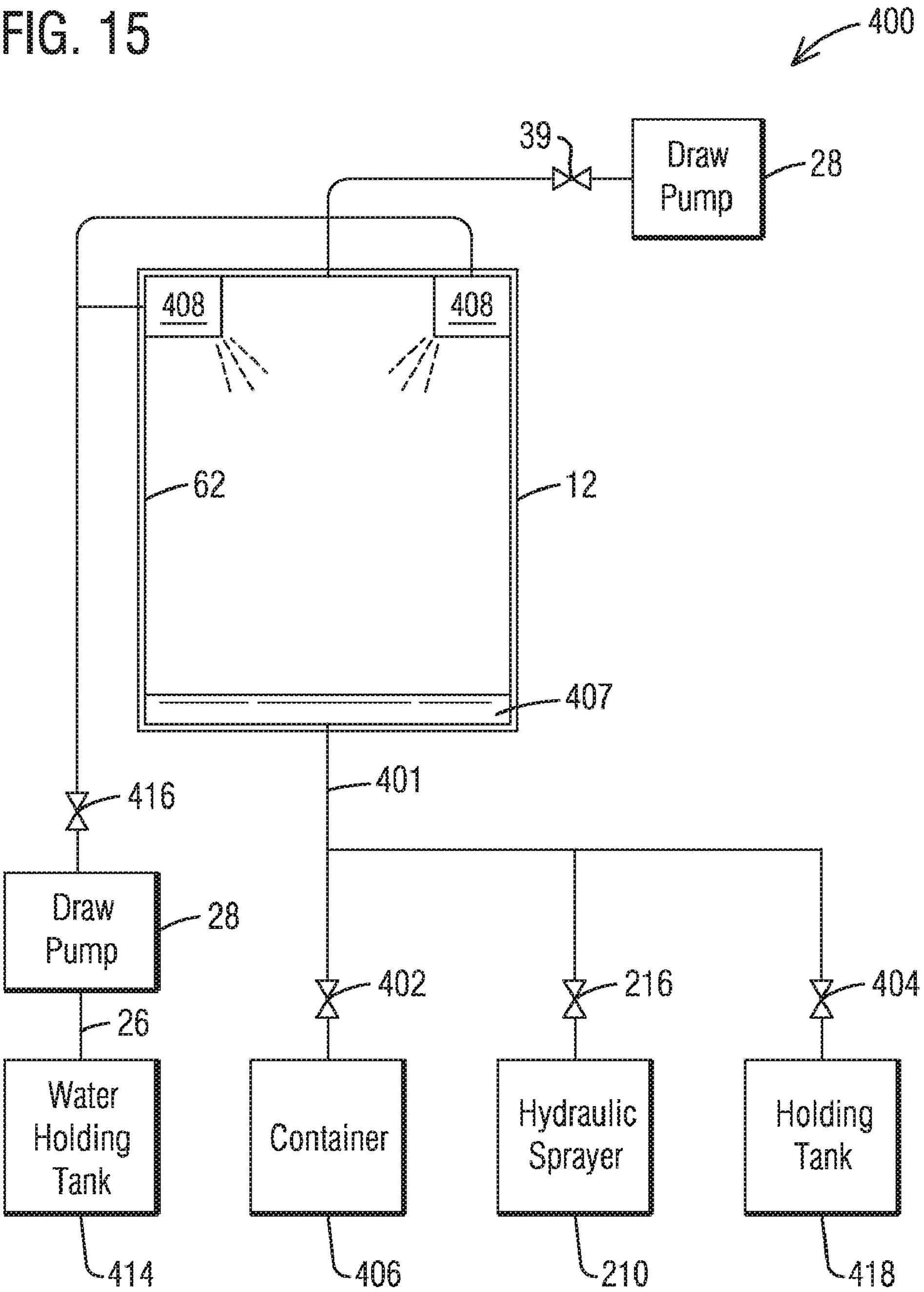
FIG. 15 schematically illustrates an exemplary system for cleaning tanks on the coating operations vehicle.

FIG. 15 illustrates a system 400 for cleaning interior surfaces 62 of the tanks 12*a*-12*f* mounted on the coating operations vehicle 8. The described cleaning of a single tank 12 is exemplary of cleaning each of the tanks 12*a*-12*f*. When a first coating present in one of the tanks 12 is depleted or needs to be removed, e.g., changed from a first type to a second type, the cleaning system 400 can operate on a tank 12 to clear out feed lines which have carried the coating into the tank or from the tank and through associated hoses 230 to spray guns 608. The tank cleaning system 400 is particularly useful for providing a circulating wash for removing the first coating material from the tank and feed lines, especially before a second coating material is placed in the tank 12. However, the cleaning system can also be used before refilling an emptied tank with coating of the same type and color.

Figure 16:
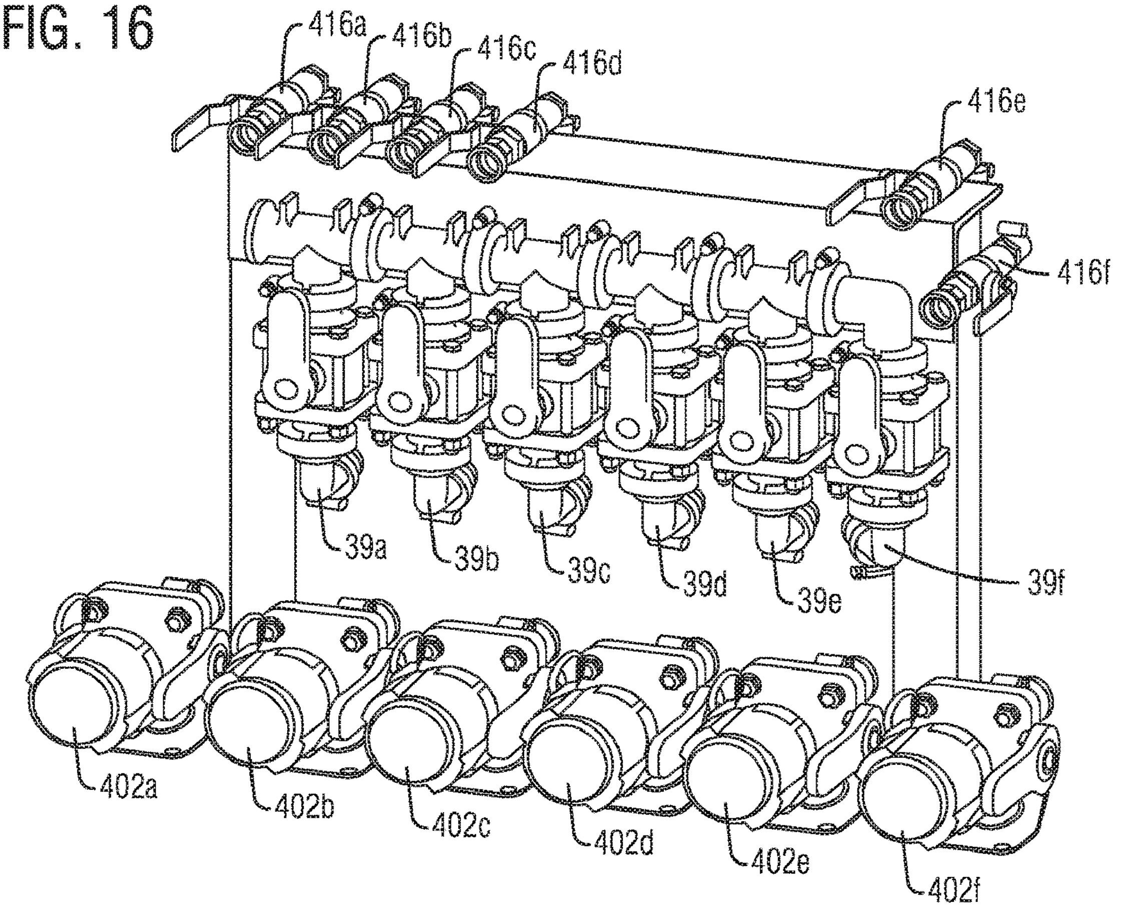
FIG. 16 provides a perspective view of a series of water intake valves in the cleaning system of FIG. 15.

The tank cleaning system 400 includes an input line 39L, having an in-line input fill valve 39, and an output line 401 coupled to three output valves arranged in parallel (drain valve 402, output valve 216, holding tank valve 404). The output line 401 is also shown in FIG. 6. In other embodiments the tank 12 may include multiple input valves or fewer or more than three output valves. The input valve 39, shown in FIG. 1, is used to fill the tank 12 with coating. Tank output valve 216 is also associated with the tank dispensing system 200, through which coating flows to the hydraulic sprayer 210 for dispensing through one or more hoses 230 to the spray guns 608. The perspective view of FIG. 16 illustrates the series of fill valves 39 and drain valves 402.

Figure 17:
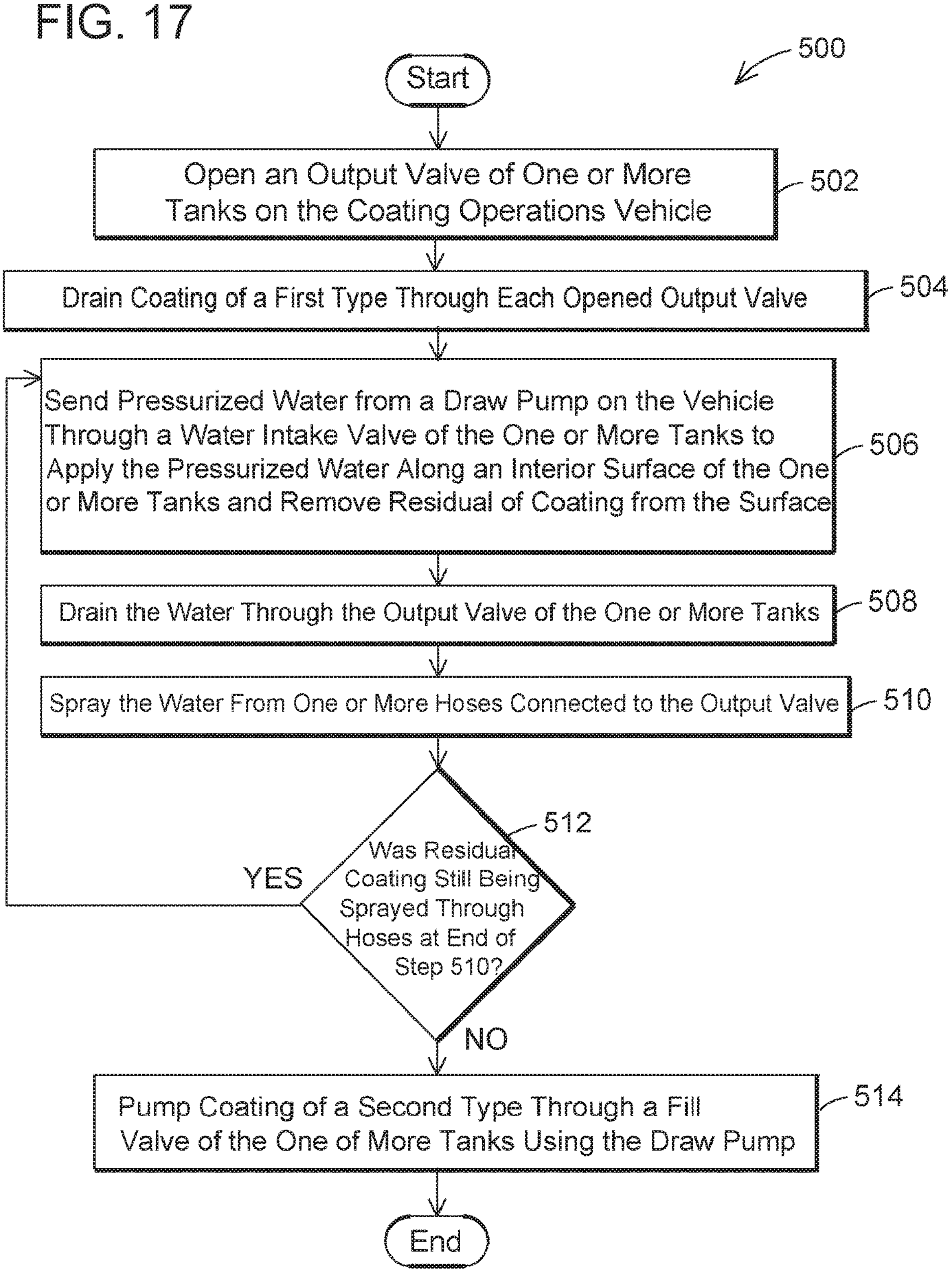
FIG. 17 illustrates an exemplary method for cleaning tanks on the coating operations vehicle.

The flow diagram of FIG. 17 illustrates an example method 500 for cleaning one or more tanks on the vehicle 8. While the tank cleaning method 500 is described with reference to a single tank 12, it is applicable to all of the tanks 12*a*-12*f*. In step 502, an output valve of the tank 12 is opened. In an example embodiment, the drain valve 402 of the tank 12 is the output valve which is opened. In step 504, a remaining layer 407 of coating of a first type, such as illustrated in the tank 12 of FIG. 15, is drained through the output valve opened in step 502. The remaining layer 407 of coating of the first type passes from the tank 12 through the drain valve 402 and into a container 406 such as a five-gallon bucket. The tank drain valve 402 is then closed. However, even after performing steps 502 and 504, draining the layer 407 of the first coating into the container 406, residual coating of the first type normally remains along inside surfaces 62 of the tank 12, and this is removed with the cleaning system 400.

In step 506, pressurized water, provided in a holding tank 414, is drawn with the pump 28, through a wash water intake valve 416, and to a water delivery system 408 at the tank 12. See, also, FIG. 16. The holding tank 414 may have a 60 gallon capacity. To operate the system 400, a feed line from the draw pump 28 is connected through the wash water intake valve 416 to the water delivery system 408. During operation of the cleaning system 400 the wash water intake valve 416 is open. Each illustrated tank 12*a*-12*f* includes such an in-line wash water intake valve which is open when the tank is being cleaned according to the tank cleaning method 500. With the draw tube 26 of the draw pump 28 placed in the holding tank, the needed water from the holding tank 414 is drawn through the tube 26 by the pump 28 and pressurized by the draw pump 28.

With the valve 416 open, the pressurized water is fed to the water delivery system 408 and applied along the inside surface 62 of the tank 12 to remove residuals of the coating of the first type. The water delivery system 408 circulates water along the inside surface 62 of the tank 12. In one embodiment, the water delivery system 408 is a circulating sprinkler system with which the residuals of coating of the first type are cleaned off from the inside surface 62 of the tank 12 by injecting water tangentially along the inside surface 62 with a circulating or circumferential flow. Consequently, any residual coating of the first type is rinsed off the inside surface 62 of the tank 12. With the draw pump 28 activated, the injected water may be applied for a 5 minute cleaning period.

After completion of the cleaning period, in step 508 the water applied along the inside surface 62 of the tank 12 in step 506 is drained through an output valve of the tank 12. For example, the output valve 216 is opened so that the rinse water which has been circulated along the inside surface 62 of the tank 12 is passed through the opened output valve 216 and to the hydraulic sprayer 210.

In step 510, the hydraulic sprayer 210 is activated to send the drained rinse water through the opened output valve 216 and through one or more spray guns on ends of hoses 230. This spraying operation in step 510 clears the hoses 230 associated with the tank of the coating material of the first type.

In step 512, a decision is made based on whether, at the end of the cleaning period of Step 510, residuals of the coating of the first type continued to flow through the spray coming through the one or more spray guns on the end of the hoses 230. If only clean water was observed as a spray gun output during step 510, the determination in step 512 is negative and the method 500 proceeds to step 514. If residual coating of the first type was observed mixed with the water sprayed through a spray gun during step 510, the determination in step 512 is positive and the operator proceeds to repeat steps 506-510.

In step 514, the tank 12 may be filled with coating material of a second type according to the tank filling method 100.

In an example embodiment, the holding tank valve 404 is opened and the rinse water which was circulated along the inside surface 62 of the tank 12 is passed to a gravity fed holding tank 418 on the vehicle 8. After the rinse water is passed into the holding tank 418, step 506 is performed, and in step 508, with the holding tank valve 404 closed, the output valve 216 is opened, and the water is passed through the hydraulic sprayer 210. In step 510, the hydraulic sprayer 210 is activated to spray the rinse water through spray guns on ends of one or more hoses 230. This step 510 clears the hose lines 230 of the coating material of the first type and step 514 determines whether residual coating I was in the water sprayed from the hose lines 230. In one example embodiment, the cleaning system 400 need not include the holding tank valve 404 and may dispense the rinse water from the tank 12 through the output valve 216 and the hoses 230, without draining rinse water into the holding tank 418.

Figure 18:
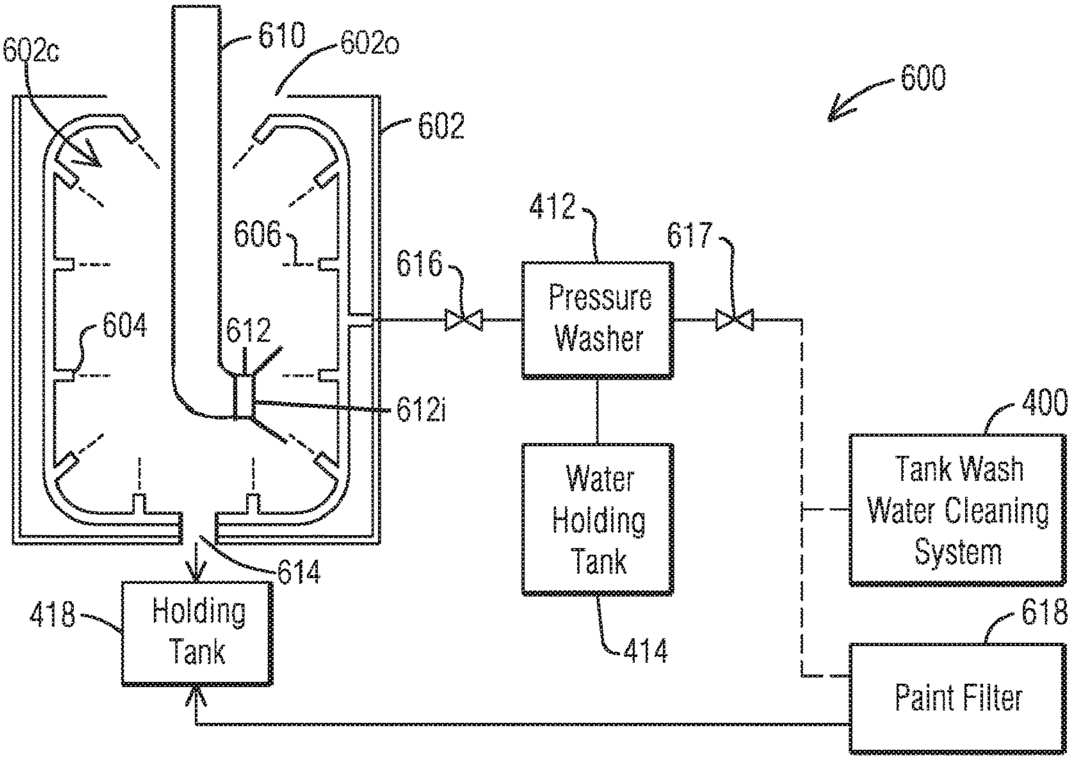
FIG. 18 schematically illustrates an exemplary system for cleaning the nozzle of a paint spray gun.

FIG. 18 schematically illustrates a system 600 for cleaning nozzles of spray guns which apply paint and other coatings. In the illustrated example, the nozzle cleaning is effected with high pressure water, but the applied liquid may be a water based solution or other fluid suitable for facilitating removal of coating residue. After using the tank dispensing system 200 to dispense a coating from spray guns at the end of the hoses 230, residuals of the coating typically build up on an inside 612*i* of the nozzle 612 or safety housing and along the tip of the spray gun. Conventionally, nozzle cleaning operations have introduced water which passes through the hoses 230 and through the nozzle, i.e., from the fluid passage on the inside of the spray gun. With the water passing along the inside of the spray gun, it has been determined that this method of cleaning does not completely remove the residual coating material on the inside of the nozzle in regions along the location of the tip. An inability to more completely clean the nozzles of the spray guns results in the nozzle tips having to be discarded, which is costly. The nozzle cleaning system 600 cleans the nozzles with high pressure water impinging surfaces of the nozzle tips from outside of the spray gun. This method and design of cleaning has been found more effective at dislodging residual coating material on the inside of the nozzle tips than conventional cleaning methods. With a nozzle cleaning system that can more effectively clean the nozzles, the useful life of nozzle tips is extended, and the tips need not be discarded with such limited use, thereby providing considerable cost savings.

With reference to FIG. 18, the nozzle cleaning system 600 includes a canister 602, which may be of cylindrical or rectangular shape, having an opening 602*o* at the upper end. The view of the canister 602 is in cross section. The size of the opening may be substantially the area circumscribed by the perimeter along the upper end of the cylindrical or rectangular shape. The canister 602 comprises a series of water spray orifices 604 along the interior. Some or all of the orifices are shown positioned along the plane through which the view in cross section is taken. The orifices are positioned to eject sprays of water 606 at a high velocity within the interior of the canister 602. As indicated in FIG. 18, the orifices may be aligned in a plane, or they may be distributed circumferentially about the interior of the canister. The canister 602 may feature twelve or more, or as few as four, water spray orifices 604 distributed along the interior of the canister 602. The illustrated number and configuration of orifices is exemplary. In an example embodiment, the canister 602 receives high pressure water, e.g., at 4,000 psi, from a pump which may be in the form of a hydraulic sprayer, referred to in the drawing as, for example, a pressure washer 412. The pump draws water from the holding tank 414. The needed water may also be provided directly from a local water source at a job site via a hose coupled to the pump. Water received in the canister from the spray collects at the bottom of the chamber 602*c* and can be removed through a drain 614 by gravity feed into a holding tank 418.

Figure 19:
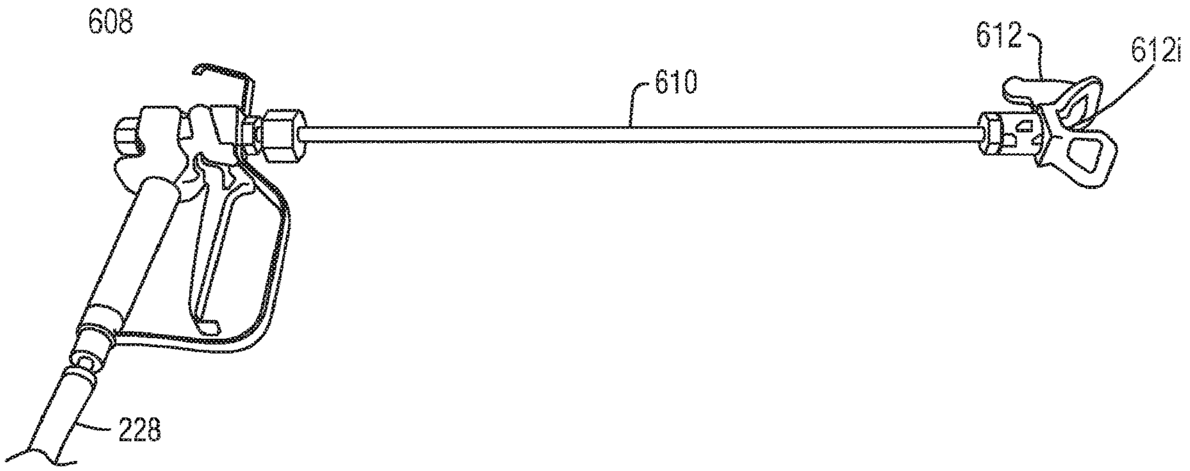
FIG. 19 is a side perspective view of the paint spray gun showing a spray nozzle cleaned by the system of FIG. 18.

FIG. 19 provides a side perspective view of a spray gun 608 attached to a hose 230, with an extension wand 610 positioned between the spray gun 608 and the nozzle 612. With the paint spray gun nozzle 612, including the nozzle tip, attached to the wand 610, the nozzle can conveniently be extended through the opening 602*o* and into a chamber 602*c* within the canister for cleaning by the system 600. Although FIG. 18 illustrates the nozzle 612 attached to a curved tube, it is to be understood that the structure as shown in FIG. 19 (i.e., a straight wand 610 with the nozzle axially aligned with the wand) can be conveniently be extended through the opening 602*o* and into a chamber 602*c*, with the nozzle extended in a downward direction. When the opening of the nozzle faces toward the bottom of the chamber, the orifices may be situated along lower portions and the bottom of the chamber 602*c* to direct spray to the interior of the nozzle at a variety of angles.

Figure 21:
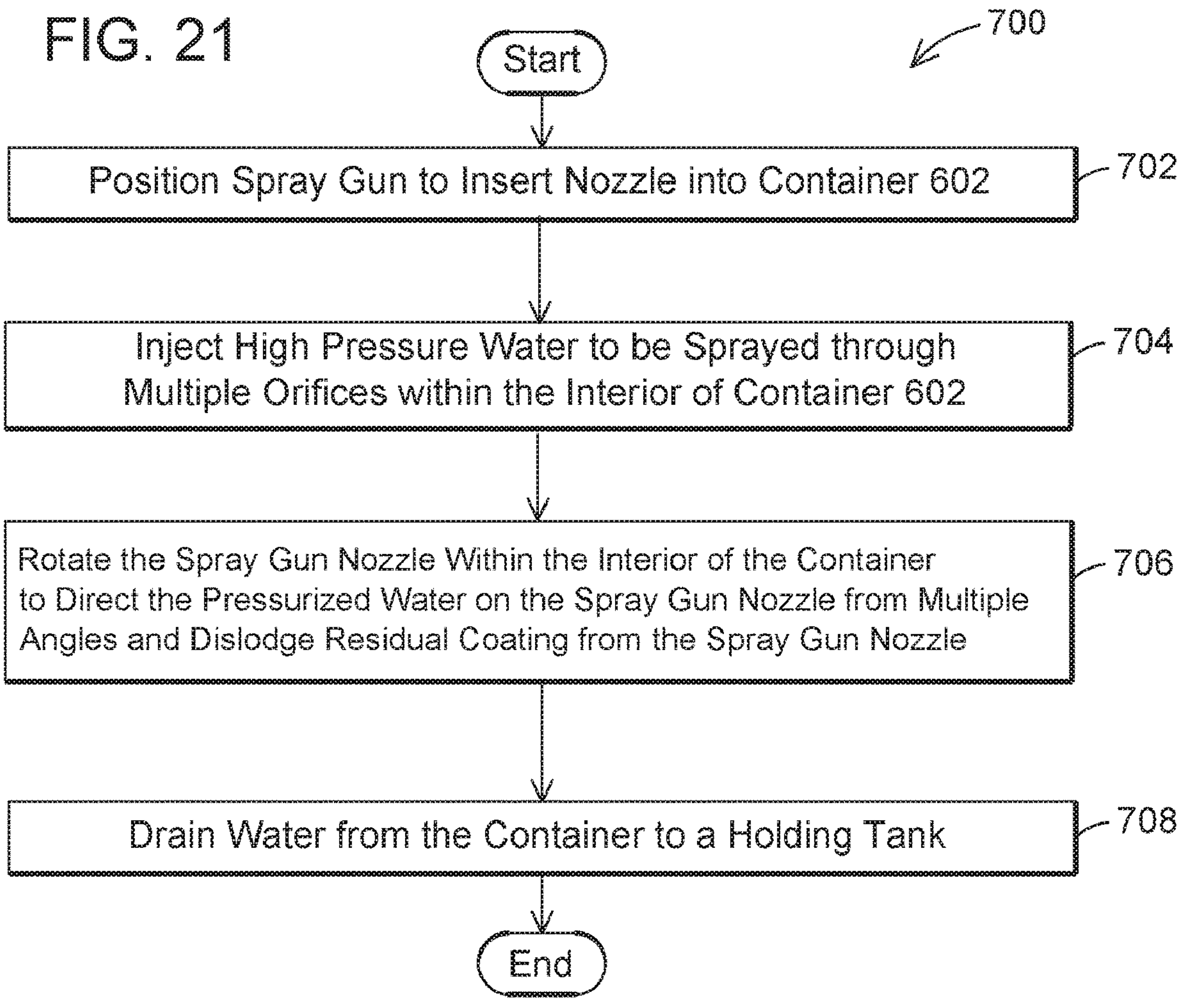
FIG. 21 illustrates an exemplary method for cleaning the nozzle of a paint spray gun.

The flow diagram of FIG. 21 illustrates a method 700 for cleaning the nozzles 612 of paint spray guns 608. Step 702 is performed after a coating application during which coating is sprayed through a nozzle 612 on the end of a spray gun 608, e.g., with the paint dispensing method 350, described in FIG. 14. As described in Step 368 of the paint dispensing method 350, after pumping action of the hydraulic sprayer 210 is turned off, one or more of the primer flow control valves 278*a*-278*c* are opened to release pressure and coating present (i) within feed lines between the tanks 12 and hydraulic sprayers 210 or (ii) within feed lines between the hoses 230 and hydraulic sprayers 210, to send material to the overflow tank 272. It is not necessary to remove the nozzle 612 from the spray gun 608 in order to clean the nozzle. The cleaning process may also be performed expeditiously with the nozzle 612 attached to the extension wand 610 only, i.e., with the extension wand disconnected from the spray gun 608. Generally, in Step 702, the spray gun 608 or wand 610 is positioned to insert the nozzle 612 within the canister 602. When the entire spray gun is connected, this may be conveniently effected by winding the associated hose 230 on a reel 228 (e.g., with a motorized drive) until about 15 feet (~5 meters) of hose length extends from the hose reel. This provides a sufficient length of hose to permit bringing the spray gun to a position on or next to the coating operations vehicle where the canister 602 is located for nozzle cleaning with the system 600. Integrally forming the nozzle cleaning system 600 with equipment associated with other systems on the coating operations vehicle 8 enables provision of a portable or mobile nozzle cleaning apparatus for use at the job site to effectively clean spray nozzles 612 immediately after use at the job site.

In step 704, with the pressure washer 412 activated, a first valve 616 is opened to inject pressurized water through the orifices 604 to create multiple high pressure, high velocity sprays in the interior of the canister 602.

The spray gun nozzle 612 is exposed to the multiple orifice sprays in the interior of the open canister 602 for a minimum time period which may range from one to two minutes.

In step 706, during the time period that spray gun nozzle 612 is exposed to the multiple orifice sprays the spray gun nozzle 612 is rotated within the interior of the container so that the pressurized water sprays are directed on the spray gun nozzle 612 from multiple angles to facilitate dislodging of residual coating from the spray gun nozzle 612. The extension wand 610 and nozzle 612 may be rotated within the interior of the open canister 602. In other embodiments, the canister and orifice assembly may be designed so that jets of pressurized water rotate about the nozzle 612.

In an advantageous design, multiple instances of ejected sprays 606 of water are simultaneously provided from multiple angles to dislodge the residual coating along the inside 612*i* of the nozzle 612. This may involve rotating the nozzle 612 both clockwise and counterclockwise within the canister 602 to assure all portions of the nozzle 612 receive necessary amounts of the high pressure water sprays 606 from all relevant angles of incidence to assure complete cleaning of the nozzle 612.

In step 708, water is drained from the open canister 602 to the holding tank 418. Water may then be drained from the holding tank 418.

With the system 600 of FIG. 18, when second valve 617 is open, the pressure washer 412 can be used to perform various tasks, such as cleaning components other than the spray nozzle 612. For example, the pressure washer pump 412 provides pressurized water to the tank cleaning system 400, for cleaning the inside surface 62 of the tanks 12 before the tanks 12 are filled with a different type of coating. The pressure washer 412 may also be used to clean in-line paint filters 618 that are removable from the hydraulic sprayer 210 of FIG. 8.

Figure 20:
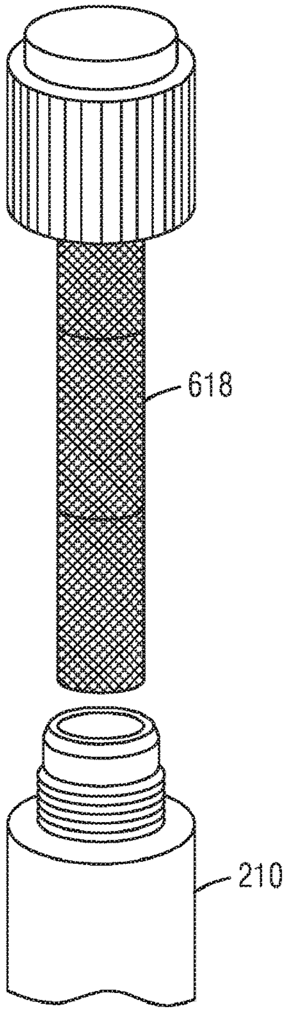
FIG. 20 is a perspective elevation view of a paint filter cleaned by the system of FIG. 18.

FIG. 20 is a side view of the paint filter 618 after removal from the hydraulic sprayer 210 for cleaning by the pressure washer 412 in the system 600. The pressure washer 412 may be adjusted to a low velocity/pressure setting when it is used to clean the paint filter 618. As the paint filter 618 is cleaned by the pressure washer 412, water is also drained to the holding tank 418.

Figure 22:
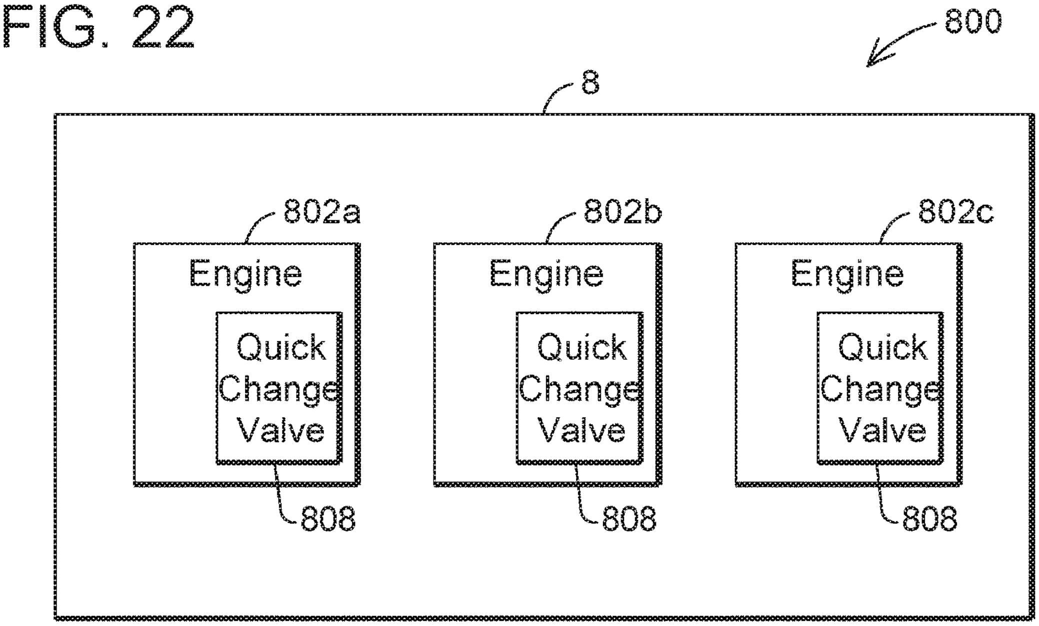
FIG. 22 schematically illustrates an exemplary system for changing oil in a plurality of engines on a the coating operations vehicle.

The hydraulic sprayers 210 used in the tank dispensing system 200 of FIG. 8 each include a gasoline powered engine 802 such as shown in FIG. 10, and thus require regular oil changes, e.g., once per month. FIG. 22 is a block diagram of a system 800 formed on the coating operations vehicle for changing oil in a plurality of paint sprayer engines 802*a*-802*c* on the vehicle 8. As illustrated in FIG. 22, the oil changing system 800 includes a quick change valve 808 for each engine 802.

Figure 23A:
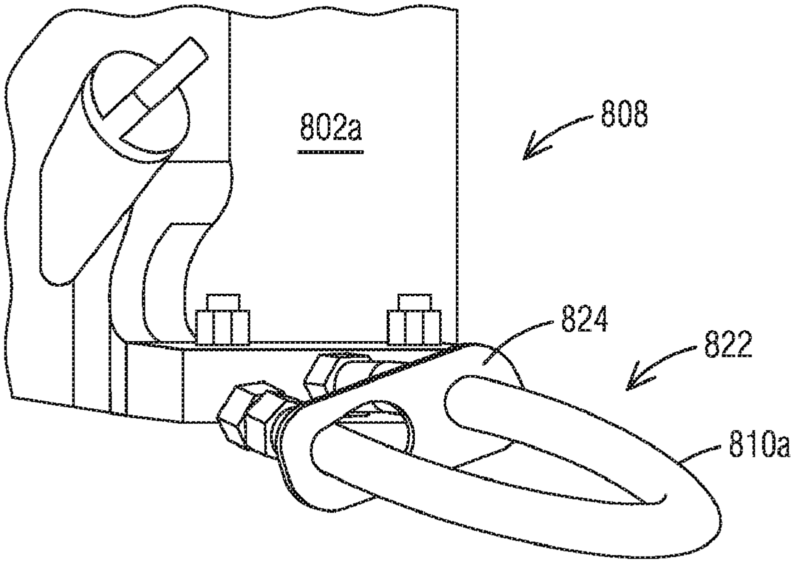
FIG. 23A is a perspective view of a portion of the oil changing system showing an exemplary hose attached in a retracted configuration while attached to an engine.

FIG. 23A is a perspective view of the quick change valve 808 including a hose 810 attached to the paint sprayer engine 802 with a threaded fitting on a first hose end that secures the hose to a threaded oil discharge opening on the engine 802. The threaded opening on the engine 802 is one which, in other applications, is used to secure a conventional drain plug.

Figure 23B:
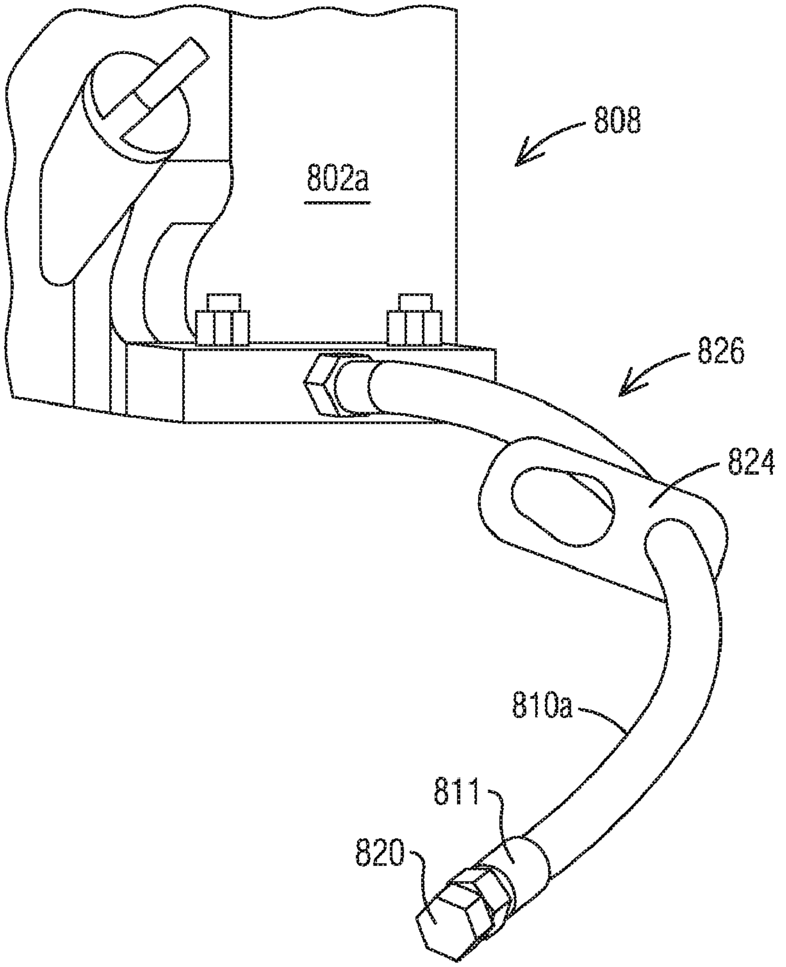
FIG. 23B is a perspective view of another portion of the oil changing system showing an exemplary cut off valve on an end of the hose of FIG. 23A with the hose shown in an extended position.

FIG. 23B is a perspective view of a cut off valve 820 on a second end of the hose 810. The cut off valve 820 opens or closes, by rotating the valve 820, to drain oil from the engine 802. In one embodiment, the cut off valve 820 may be secured to the second end of the hose 810 with a hose clamp 811. FIG. 23A shows the hose 810 in an initial retracted position 822. In the retracted position 822, the hose 810 is folded up and held by a clip 824. The hose 810 is positioned in the retracted position 822 during the normal operation of the engine 802 and the paint sprayer 210. FIG. 23B depicts the hose 810 in an extended position 826 such as when the engine 802 is turned off and the oil in the engine 802 is to be changed, at which time the hose 810 is removed from the clip 824 and unfolded to move from the retracted position 822 shown in FIG. 23A to the extended position 826. When oil in the engine 802 is to be changed, the cut off valve 820 is positioned over a container or a drain (not shown) and the exemplary cut off valve 820 is rotated to an open configuration which allows discharge of the oil from the engine 802 into the container or the drain.

Figure 24:
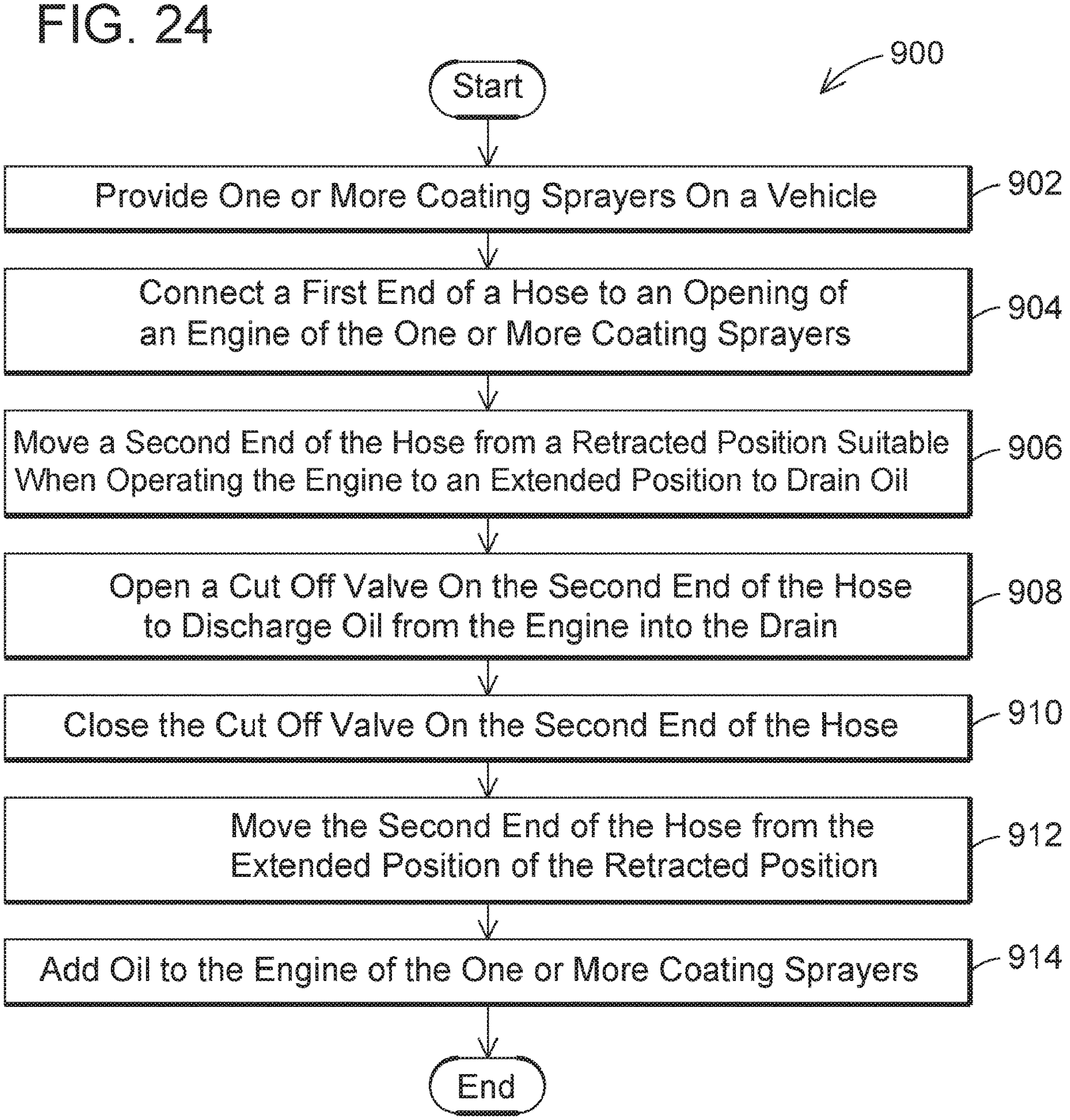
FIG. 24 illustrates an exemplary method for changing oil in a plurality of engines mounted on the coating operations vehicle.

The flow diagram of FIG. 24 describes a method 900 for changing oil in a plurality of paint sprayer engines 802*a*-802*c* on the coating operations vehicle 8. In step 902, one or more coating sprayers 210 are mounted on the vehicle 8. Although three paint sprayers 210*a*-210*c* are illustrated on the vehicle 8 the embodiments are not limited to any specific number of paint sprayers.

In step 904, the first end of the hose 810 is connected to an oil discharge opening in the engine 802 of the paint sprayer 210. In this example, the threaded fitting 812 on the first end of the hose 810 is connected to the threaded opening on the engine 802.

In step 906, the second end of the hose 810 is moved from the retracted position 822 at the engine 802, suitable during engine operation, to the extended position 826 to drain oil into a drain or a container. In step 908, the cut off valve 820 on the second end of the hose is opened to discharge oil from the engine 802 into the drain or the container. In step 910, after the oil has been discharged from the engine 802 into the drain or the container, the cut off valve 820 is rotated to a closed position.

In step 912, the second end of the hose 810 is moved from the extended position 826 to the retracted position 822, e.g., by folding the hose 810 to the retracted position 822 using the clip 824. In step 914, oil is added to the engine 802 of the paint sprayer 210.

The oil changing system 800 provides a relatively clean and fast means for emptying oil from the engine 802 into a container or a drain. In contrast to this, conventional oil changing systems include a threaded oil change plug on the engine 802 housing which discharge oil around the engine 802 housing upon rotating the drain plug, and thus frequently require clean up. FIG. 22 illustrates multiple engines 802*a*-802*c* on the vehicle 8, where each engine 802*a*-802*c* is fitted with the quick change valve 808 for permanent attachment to the threaded opening on the engine 802 for efficient discharge of the oil into a container or a drain.

Figure 25:
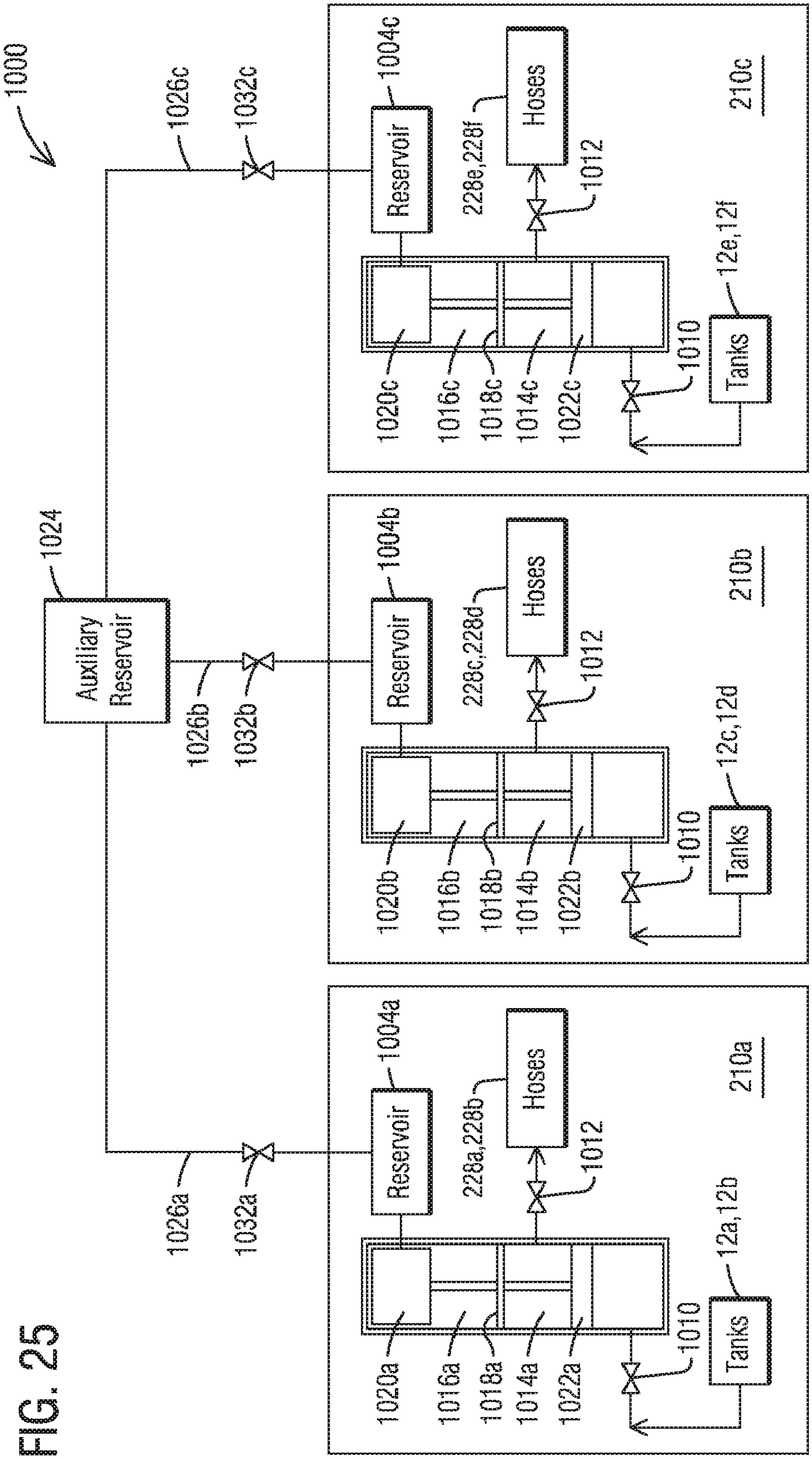
FIG. 25 schematically illustrates a system for refilling oil reservoirs in a plurality of engines mounted on the coating operations vehicle.

FIG. 25 is a block diagram of a system 1000 for refilling a reservoir 1004*a*-1004*c* in the paint sprayers 210*a*-210*c* on the vehicle 8. To illustrate the system, operation of one paint sprayer 210 is described, but all of the paint sprayers 210*a*-210*c* may include the same arrangement. FIG. 25 depicts the hydraulic sprayer 210 of the tank dispensing system 200 of FIG. 8, with a piston 1022 and reservoir 1004 within the hydraulic sprayer 210. With paint directed into the hydraulic sprayer 210 from the tanks 12 and paint directed out of the hydraulic sprayer 210 to the hoses 230, FIG. 25 depicts the hydraulic sprayer 210 as including an upper chamber 1016 and a lower chamber 1014 separated by a gasket 1018. The hydraulic sprayer 210 includes an input valve 1010 and output valve 1012 for each piston 1022, where the input valve 1010 is opened and the output valve 1012 is closed when the piston 1022 moves up, to draw paint into the lower chamber 1014. When the piston 1022 moves down, the input valve 1010 is closed and the output valve 1012 is opened, to push paint out of the lower chamber 1014 and through the hoses 230. The gasket 1018 or seal separates the lower chamber 1014 from the upper chamber 1016 where a piston cylinder 1020 is actuated and lubricating oil is delivered from the reservoir 1004 to the upper chamber 1016. The gasket 1018 or seal separates the paint in the lower chamber 1014 to prevent the paint from mixing with the lubricating oil in the upper chamber 1016.

The reservoir refill system 1000 includes an auxiliary reservoir 1024 positioned above the three hydraulic sprayers 210*a*-210*c*, each with a line 1026*a*, 1026*b* and 1026*c* connected to each reservoir 1004*a*-1004*c* in each hydraulic sprayer 210*a*-210*c*, for purposes of refilling each reservoir 1004*a*-1004*c*. Thus, in an example embodiment, the reservoir refill system 1000 provides the vehicle 8 with multiple paint sprayers 210 and provides maintenance and service to the hydraulic sprayers 210 by simultaneously providing a larger auxiliary reservoir 1024 which feeds multiple reservoirs 1004 of the multiple paint sprayers 210.

As illustrated in FIG. 25, in one example embodiment, valves 1032*a*, 1032*b* and 1032*c* are each positioned along one of the lines 1026*a*, 1026*b*, 1026*c* between the auxiliary reservoir 1024 and each hydraulic sprayer reservoir 1004*a*, 1004*b*, 1004*c*. In this example embodiment, the valves 1032*a*-1032*c* are periodically actuated for a specific amount of time until the hydraulic sprayer reservoirs 1004*a*-1004*c* are filled to a desired level. In an example embodiment, a worker actuates the valves 1032*a*-1032*c* periodically during a day, on each occasion until observing that the hydraulic sprayer reservoirs 1004*a*-1004*c* are at the desired level or full, such as by observing a reservoir overflow, for example. In one example embodiment, the reservoir refill system 1000 includes a drain to collect any reservoir overflow, such as a holding tank positioned beneath the reservoir on the vehicle, for example. A shelf may be formed above each hydraulic sprayer 210 with the auxiliary reservoir 1024 provided as an inverted bottle of lubricating oil secured on the shelf to discharge lubricating oil when the bottle is squeezed. In this example embodiment, periodically during the day, a worker squeezes the inverted lubricating oil bottle to top off each reservoir 1004 in each hydraulic sprayer 210. Although FIG. 25 illustrates one auxiliary reservoir 1024 used to service all of the reservoirs 1004, a respective auxiliary reservoir can be provided for each hydraulic sprayer reservoir.

An advantage of the reservoir refill system 1000 is that in order to use the system 1000 the hydraulic sprayers 210 need not be moved during use. Moving the sprayers causes significant loss in throat seal. Thus, the lubricating oil and reservoir usage requirements for the pistons of the paint pumps is significantly lower than in conventional paint pumps, such as 75% lower, for example. A similar refill system can also be provided to refill hydraulic fluid of the sprayers 210.

Figure 26:
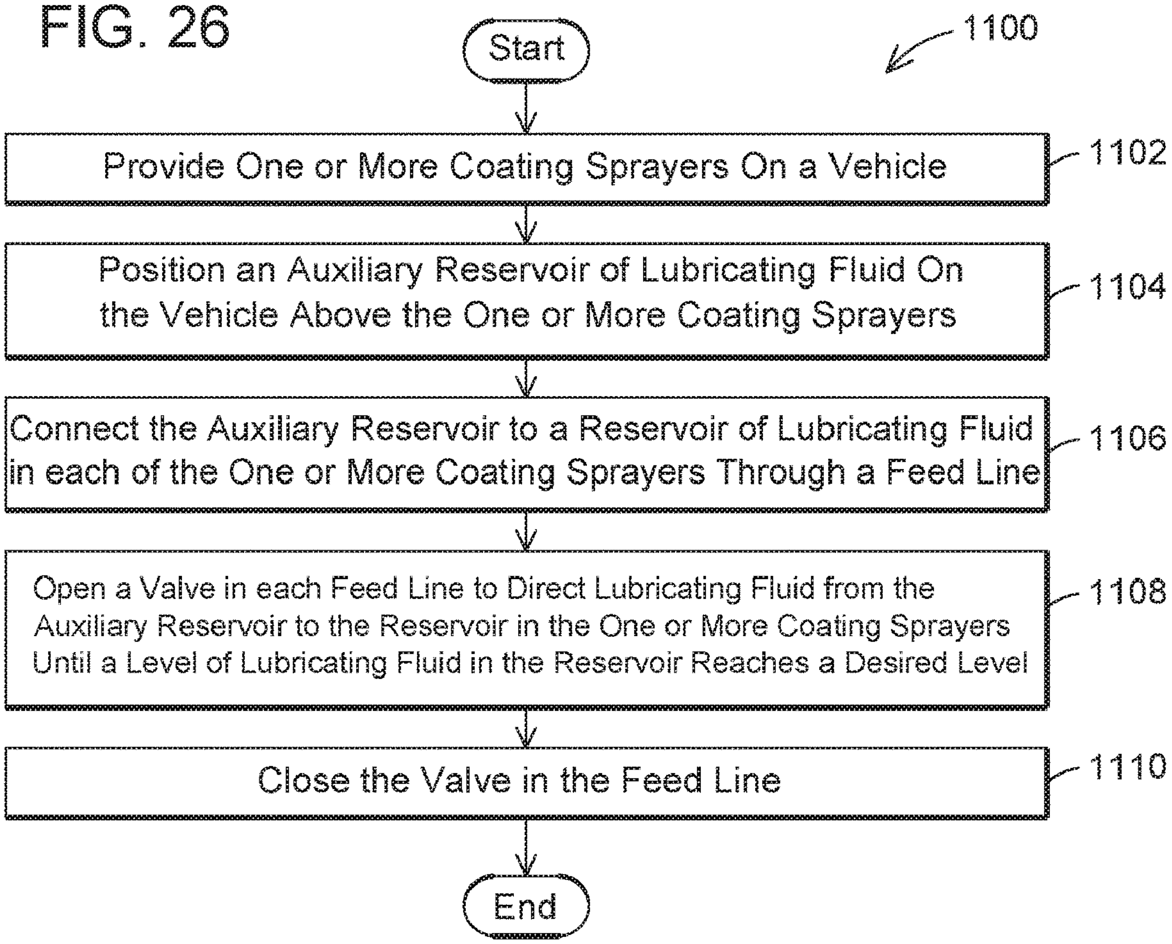
FIG. 26 illustrates an exemplary method for refilling oil reservoirs in a plurality of engines mounted on the coating operations vehicle.

FIG. 26 is a flow diagram of a method 1100 for refilling the oil reservoir 1004 in the plurality of paint sprayers 210 on the vehicle 8. In step 1102, one or more paint sprayers 210 are provided on the vehicle 8. In step 1104, the auxiliary reservoir 1024 of lubricating fluid is positioned on the vehicle 8 above the one or more paint sprayers 210.

In step 1106, the auxiliary reservoir 1024 is connected to each reservoir 1004 of lubricating fluid in the one or more paint sprayers 210. In an example embodiment, in step 1106, the auxiliary reservoir 1024 is connected to each reservoir 1004 using respective feed lines 1026 with a respective valve 1032 in each line.

In step 1108, the valves 1032 in each feed line 1026 are opened to direct lubricating fluid from the auxiliary reservoir 1024 to the reservoir 1004 in the plurality of paint sprayers 210 until a level of lubricating fluid in the reservoirs 1004 reaches a desired level. In an example embodiment, step 1108 is performed by manually actuating the valves 1032 until the level of lubricating fluid visibly reaches a desired level. In an example embodiment, the determination of whether the level of lubricating fluid reaches the desired level is based on observing an overflow from the reservoir 1004.

Figure 27:
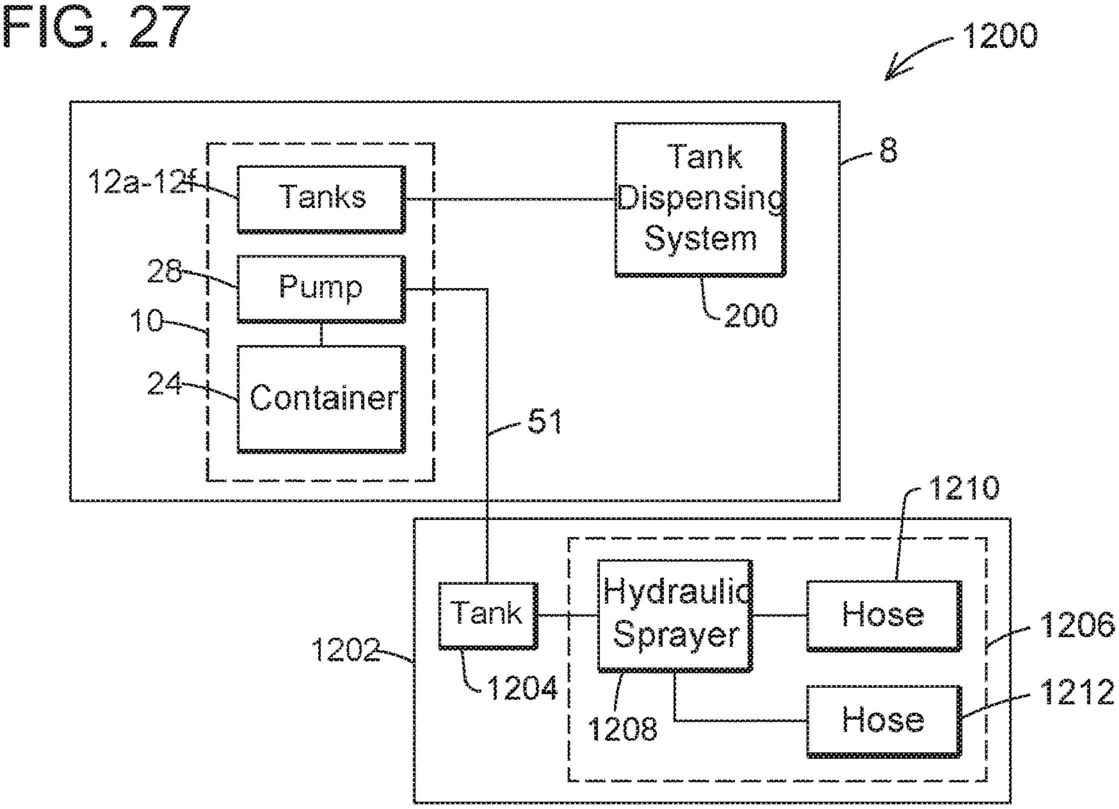
FIG. 27 schematically illustrates a system for filling tanks on a second vehicle with a pump positioned on the coating operations vehicle.

FIG. 27 is a block diagram of a system 1200 for filling a tank 1204 on a second vehicle 1202 from the draw pump 28 positioned on a first vehicle, the coating operations vehicle 8. In this example, the system 1200 fills one or more tanks 1204 on the second vehicle 1202, such as a modular trailer, from the draw pump 28 and containers 24 of the system 10 on the vehicle 8. In an example embodiment, during use of the system 1200, instead of connecting the output hoses 51 of the system 10 to the opening in the tops of tanks 12*a*-12*f* on the vehicle 8, the output hoses 51 are connected to openings in the tops of the tanks 1204 on the second vehicle 1202. The system 10 is then operated in a similar manner as previously described, except the level of paint is monitored in the tanks 1204 on the second vehicle 1202 and the paint is drawn through the draw pump 28 into the tanks 1204 until the level of paint in the tanks 1204 reaches the desired level. In an example embodiment, the tanks 1204 include the sensor 29 that is used in the system 10 to monitor the level of paint and transmits a signal to deactivate the draw pump 28 if the level of paint reaches the desired level.

As illustrated in FIG. 27, the second vehicle 1202 may include a tank dispensing system 1206 including a hydraulic sprayer 1208 and hose reels 1210, 1212 that operate in a similar manner as the tank dispensing system 200 discussed above. Although the tank dispensing system 1206 on the second vehicle 1202 depicts one hydraulic sprayer 1202 and two hose reels 1210, 1212, the tank dispensing system 1206 is not limited to this arrangement and can include more than one hydraulic sprayer or more than two hose reels. Additionally, although the second vehicle 1202 is depicted as including one tank 1204, the second vehicle can include more than one tank, where each respective tank is connected to the pump 28 with a respective output hose 51, as described in the system 10 on the vehicle 8. In one example embodiment, the second vehicle 1202 remains at the location of the vehicle 8 after the tanks 1204 have been filled and the tank dispensing system 1206 is used to spray paint at a job site of the location of the vehicle 8. In another example embodiment, the second vehicle 1202 is transported to a location other than the location of the vehicle 8 after the tanks 1204 have been filled, such that the tank dispensing system 1206 is used to spray paint at a job site other than the location of the vehicle 8.

Figure 28:
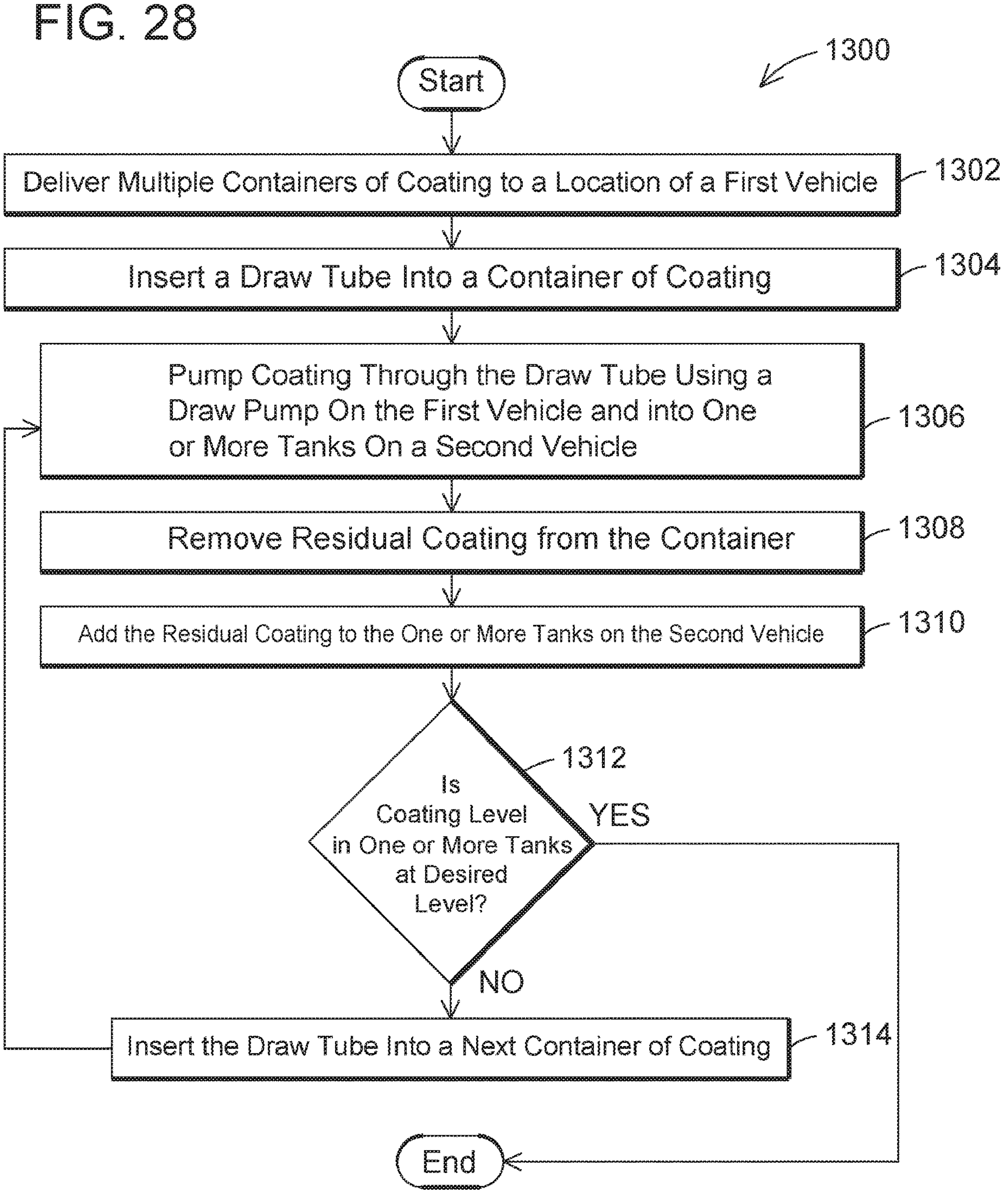
FIG. 28 illustrates an exemplary method for filling tanks on the second vehicle with the pump positioned on a first vehicle.

FIG. 28 is a flow diagram of a method 1300 for filling tanks 1204 on the second vehicle 1202 from the pump 28 positioned on the first vehicle 8. In step 1302, multiple containers 24 of coating material are delivered to a location of the first vehicle 8. In an example embodiment, in step 1302 a quantity of containers 24 are delivered which is sufficient to fill the tanks 12*a*-12*f* on the first vehicle 8 and the tanks 1204 on the second vehicle 1202. In step 1304, the draw tube 26 is inserted into the container 24 of paint, in a similar manner as step 104 of method 100. In step 1306, paint is pumped using the draw pump 28 on the first vehicle 8 and into one or more tanks 1204 on the second vehicle 1202. In steps 1308 and 1310, the residual paint is removed from the container 24 and added to a container 24, after which the residual paint is pumped from the container 24 to the one or more tanks 1204 on the second vehicle 1202 using the draw tube 26 and pump 28, in a similar manner as steps 108 and 110 of method 100. In step 1312, the level of paint in the tank 1204 is monitored and a determination is made whether the level of paint is at a desired level, in a similar manner as step 112 of the method 100. If the determination in step 1312 is positive, then the method 1300 ends. If the determination in step 1312 is negative, the method 1300 proceeds to step 1314, where the draw tube 26 is inserted into a next container 24 of paint and steps 1306, 1308, 1310, 1312 are repeated. In an example embodiment, if the determination in step 1312 is positive, water can be pumped through the draw pump 28 into the tanks 1204 to form the layer 60 of water over the paint in the tanks 1204, in a similar manner as step 116 of the method 100.

Although the flow diagrams of FIGS. 7, 13, 14, 17, 21, 24, 26 and 28 are each depicted as integral steps in a particular order for purposes of illustration, in other embodiments one or more steps, or portions thereof, may be performed in a different order, or overlapping in time, in series or in parallel, or are deleted, or one or more other steps are added, or the method is changed in some combination of ways.

The invention has been described with reference to specific embodiments but it will be evident that various modifications and changes may be made thereto without departing from the broader spirit and scope of the invention. The specification and drawings are, accordingly, to be regarded as illustrative rather than restrictive. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value.

The claimed invention is:

1. A method of acquiring and applying multiple different paint coating materials to surfaces of a structure, comprising:

a) providing a mobile road vehicle having a bed on which a plurality of tanks are mounted for use on the vehicle, the combined holding capacity of the tanks being at least 300 gallons, multiple ones of the tanks fillable with different paint coating materials, the vehicle further comprising a plurality of hydraulic sprayers mounted for powered operation on the vehicle and a plurality of feed lines connected to extend from the mounted sprayers to dispense coating material at least 200 feet away from the vehicle;

moving the vehicle to a location at which a supply of at least a first coating material is present for transfer into some or all of the tanks;

transferring coating material from the supply of at least the first coating material into a first tank in at least a first subset of the tanks with a pumping system comprising at least a first draw pump with one or more draw tubes connected to one or more of the supplies of coating material according to the following steps:

(a) with a plurality of fill lines and a tank-fill manifold having (i) an inlet connected to the pumping system to receive at least the first coating material from at least the first draw pump and (ii) multiple tank-fill outlets for transferring received coating material to multiple tanks via one or more of the fill lines, each fill line connected for passing first coating material through one or more tank-fill outlets in a first subset of the tank-fill manifold outlets to fill at least the first tank in the first subset, where flow of first coating material through each fill line connected between the tank-fill manifold and at least the first tank in the first subset is controllable with one or more first valves; and (b) controlling, with the one or more first valves, flow of first coating material passing through one or more tank-fill outlets in the first subset of the tank-fill manifold outlets to selectively fill one or more tanks in the first subset; and b) providing a first sprayer input manifold connected between multiple ones of the tanks containing different paint coatings and at least a first of the hydraulic sprayers, the first sprayer input manifold including a plurality of manifold sprayer input lines, each connectable to receive flow of a different paint coating material from a different one of the tanks, and at least one output line connected between the manifold sprayer input lines and at least one of the hydraulic sprayers to selectively carry flow of one of multiple ones of the paint coating materials from one of the manifold sprayer input lines to at least one of the hydraulic sprayers.

2. The method of claim 1 including providing one or more additional input manifolds, each additional input manifold including a plurality of additional manifold input lines and at least one output line, each additional input manifold also connected to receive flow of coating material from at least one of the tanks, and the at least one output line connected between at least one of the additional manifold input lines and at least one hydraulic sprayer to carry flow of coating material from at least one of the additional manifold input lines to at least said one of the hydraulic sprayers.

3. The method of claim 1 further including providing one or more second valves to control flow from one or more input lines in the first input manifold to enable selection of flow of coating material into the at least one of the hydraulic sprayers.

4. The method of claim 1 further including controlling flow of coating material with one or more second valves to selectively deliver the coating material between different input lines and at least one of the hydraulic sprayers.

* * * * *